(12) United States Patent
Radelet et al.

(10) Patent No.: US 11,619,790 B2
(45) Date of Patent: Apr. 4, 2023

(54) FIBER OPTIC CABLE SEALING DEVICE

(71) Applicant: COMMSCOPE TECHNOLOGIES LLC, Hickory, NC (US)

(72) Inventors: Christiaan Radelet, Aarschot (BE); Kristof Vastmans, Kessel-Lo (BE); Jozef Christiaan Mathieu Versleegers, Bree (BE); Maarten Michiels, Veltem-Beisem (BE); Erwin Beckers, Werchter (BE); Frank De Blick, Tielt-Winge (BE); Michael Maris, Paal (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/278,190

(22) PCT Filed: Sep. 19, 2019

(86) PCT No.: PCT/US2019/051885
§ 371 (c)(1),
(2) Date: Mar. 19, 2021

(87) PCT Pub. No.: WO2020/061283
PCT Pub. Date: Mar. 26, 2020

(65) Prior Publication Data
US 2021/0373267 A1 Dec. 2, 2021

Related U.S. Application Data

(60) Provisional application No. 62/861,877, filed on Jun. 14, 2019, provisional application No. 62/734,353, filed on Sep. 21, 2018.

(51) Int. Cl.
*G02B 6/44* (2006.01)
*H02G 15/013* (2006.01)

(52) U.S. Cl.
CPC ........ *G02B 6/4444* (2013.01); *H02G 15/013* (2013.01)

(58) Field of Classification Search
CPC .......................... G02B 6/4444; H02G 15/013
See application file for complete search history.

(56) References Cited

U.S. PATENT DOCUMENTS

| 3,848,074 | A | | 11/1974 | Channell |
| 5,210,374 | A | | 5/1993 | Channell |
| 5,235,134 | A | | 8/1993 | Jaycox |
| 5,959,250 | A | * | 9/1999 | Daoud ................... H02G 3/088 174/650 |

(Continued)

FOREIGN PATENT DOCUMENTS

| CN | 101424774 A | * | 5/2009 |
| CN | 206930810 U | | 1/2018 |

(Continued)

OTHER PUBLICATIONS

International Search Report and Written Opinion of the International Searching Authority for International Patent Application No. PCT/US2019/051885 dated Jan. 3, 2020, 18 pages.

(Continued)

*Primary Examiner* — Eric Wong
(74) *Attorney, Agent, or Firm* — Merchant & Gould P.C.

(57) ABSTRACT

Disclosed herein are cable sealing devices having features for enhancing effective sealing, volume compensation, seal pressurization, cable size range-taking, cable installation and insert installation. Also disclosed herein is an enclosure including at least one cable sealing device.

15 Claims, 25 Drawing Sheets

(56) References Cited

U.S. PATENT DOCUMENTS

| | | | |
|---|---|---|---|
| 6,025,557 A * | 2/2000 | Daoud | H01R 13/72 |
| | | | 174/152 G |
| 6,107,571 A | 8/2000 | Damm | |
| 6,118,076 A * | 9/2000 | Damm | H02G 15/113 |
| | | | 174/92 |
| 8,642,891 B2 | 2/2014 | Berghmans et al. | |
| 2010/0027954 A1 | 2/2010 | Gronvall et al. | |
| 2011/0164854 A1 | 7/2011 | Desard et al. | |
| 2012/0230644 A1 | 9/2012 | Marmon et al. | |
| 2015/0184777 A1* | 7/2015 | Ray | H02G 3/088 |
| | | | 277/606 |
| 2015/0219858 A1* | 8/2015 | Timmins | G02B 6/3817 |
| | | | 385/135 |

FOREIGN PATENT DOCUMENTS

| | | |
|---|---|---|
| DE | 100 42 952 A1 | 4/2002 |
| KR | 20140126399 A * | 2/2013 |
| WO | WO-2015120901 A1 * | 8/2015 ........... G02B 6/4444 |
| WO | 2016/071394 A2 | 5/2016 |
| WO | WO-2016071394 A2 * | 5/2016 ............ F16J 15/062 |
| WO | 2017/167819 A1 | 10/2017 |

OTHER PUBLICATIONS

"Plastics and ebonite—Determination of indentation hardness by means of a durometer (Shore hardness)", ISO 868, 10 pages (Mar. 2003).

"Standard Practice for Stress Relaxation Testing of Raw Rubber, Unvulcanized Rubber Compounds, and Thermoplastic Elastomer", ASTM Designation: D 6048-96, 16 pages (1997).

"Standard Test Methods for Rubber Property—Compression Set", ASTM Designation: D395-16e1, 8 pages (Mar. 2017).

"Standard Test Methods for Rubber Property—Durometer Hardness", ASTM Designation: D2240-15e1, 13 pages (Nov. 2017).

Extended European Search Report for European Patent Application No. 19862990.9 dated May 10, 2022, 8 pages.

* cited by examiner

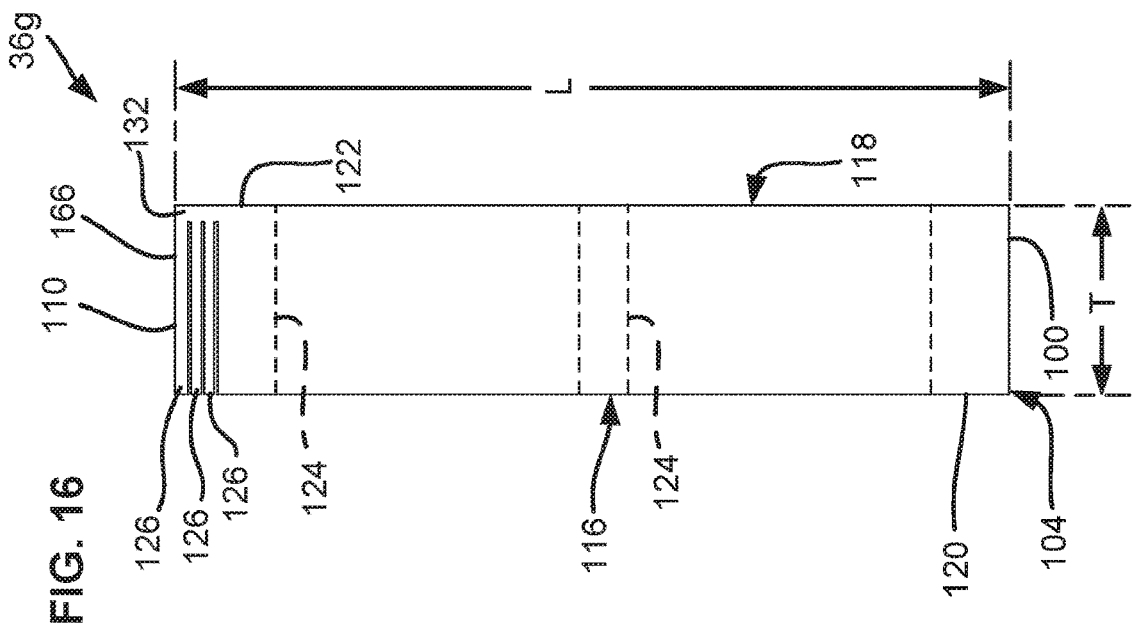
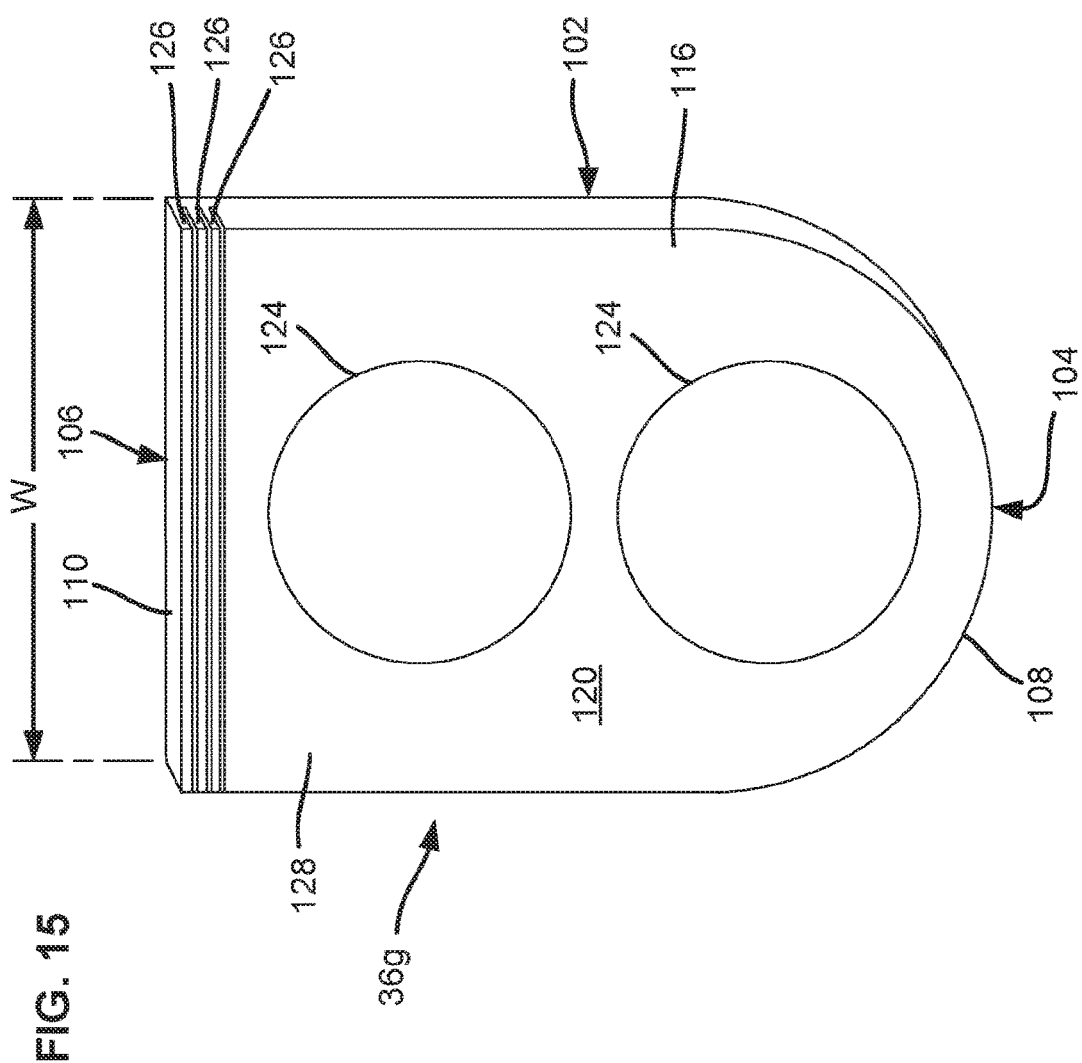

FIBER OPTIC CABLE SEALING DEVICE

CROSS-REFERENCE TO RELATED APPLICATIONS

This application is a National Stage Application of PCT/US2019/051885, filed on Sep. 19, 2019, which claims the benefit of U.S. Patent Application Ser. No. 62/734,353, filed on Sep. 21, 2018, and claims the benefit of U.S. Patent Application Ser. No. 62/861,877, filed on Jun. 14, 2019, the disclosures of which are incorporated herein by reference in their entireties. To the extent appropriate, a claim of priority is made to each of the above disclosed applications.

TECHNICAL FIELD

The present disclosure relates generally to sealing fiber optic cables.

BACKGROUND

Fiber optic distribution networks are becoming prevalent in part because service providers want to deliver high bandwidth communication capabilities to customers (i.e., subscribers). Typical fiber optic network architectures include a plurality of fiber optic cables distributed outwardly from a central location (e.g., a central office) toward subscriber locations.

In a typical fiber optic distribution network, sealed and re-enterable enclosures can be used to provide access to the optical fibers of the network distribution cables. Commonly, multi-fiber distribution cables are passed through enclosures and optical fibers of the cables are accessed within the enclosures. Splice trays, passive optical splitters and wave length division multiplexers can be provided within the enclosures. In certain examples, optical fibers accessed from distribution cables can be coupled to optical components (e.g., a passive optical splitter or a wavelength division multiplexer) and outputs from the optical components can be coupled to drop cables routed from the enclosures. In certain examples, the enclosures can include ruggedized adapter ports for allowing pre-connectorized drop cables to be connected to the fibers accessed from the distribution cables. In other examples, fibers of the distribution cable can be spliced to optical fibers corresponding to drop cables routed out of the enclosure through sealed ports.

There is a need for improved sealed and re-enterable enclosures as well as improved seals for such enclosures.

SUMMARY

One aspect of the present disclosure relates to an enclosure. The enclosure comprises a housing including a base and a removable cover that cooperate to define an interior when the cover is mounted to the base. The base defines a plurality of seal mounting pockets separated by divider walls. The enclosure also comprises a perimeter seal that extends about a perimeter of the housing and provides sealing at an interface between the base and the cover. The enclosure further comprises a plurality of cable sealing devices that mount within the seal mounting pockets of the base. The cable sealing devices include cable sealing inserts defining insert perimeter profiles. The cable sealing inserts include main bodies. The insert perimeter profiles of the cable sealing inserts extend along first axes between top and bottom ends of the main bodies. The insert perimeter profiles of the cable sealing inserts also include first and second opposite sides of the main bodies that extend between the top and bottom ends of the main bodies. The insert perimeter profiles of the cable sealing inserts further include side protrusions positioned adjacent the top ends of the main bodies that project outwardly from the first and second sides of the main bodies. The main bodies of the cable sealing inserts further have major front and back sides separated by thicknesses of the main bodies. The main bodies define cable pass-through locations that extend through the thicknesses of the main bodies between the major front and back sides of the main bodies. When the cable sealing devices are mounted in the seal mounting pockets, the side protrusions of adjacent ones of the cable sealing inserts extend over top ends of the divider walls and contact one another. When the cable sealing devices are mounted in the seal mounting pockets, the perimeter seal also extends over the top ends of the cable sealing inserts.

Another aspect of the present disclosure relates to a cable sealing device. The cable sealing device comprises a cable sealing insert defining a perimeter profile. The cable sealing insert includes a main body. The perimeter profile of the cable sealing insert extends along a first axis between top and bottom ends of the main body. The perimeter profile of the cable sealing insert also includes first and second opposite sides of the main body that extend between the top and bottom ends of the main body. The main body of the cable sealing insert further has major front and back sides separated by a thickness of the main body. The main body defines at least one cable pass-through location that extends through the thickness of the main body between the major front and back sides of the main body. The cable sealing insert is made of a material having a Shore 000 hardness in the range of 30-60 and a compression set less than or equal to 10 percent.

A further aspect of the present disclosure relates to a cable sealing device. The cable sealing device comprises a one-piece molded cable sealing insert defining a perimeter profile. The cable sealing insert includes a main body. The perimeter profile of the cable sealing insert has an elongate length that extends along a first axis between first and second ends of the main body. The first end of the main body is rounded and the second end of the main body is flat. The perimeter profile of the cable sealing insert also includes first and second opposite sides of the main body that extend between the first and second ends of the main body. The first and seconds sides are oriented to diverge away from one another as the first and second sides extend toward the second end of the main body such that the main body has a tapered configuration. The main body of the cable sealing insert further has major front and back sides separated by a thickness of the main body. The main body fully defines at least one cable pass-through opening that extends through the thickness of the main body between the major front and back sides of the main body. The cable sealing insert is made of a material having a Shore 000 hardness in the range of 30-60 and a compression set less than or equal to 10 percent.

Aspects of the present disclosure relate to cable seals and cable sealing configurations that are capable of sealing cables having a wide range of cable diameters (e.g., the seals or sealing configurations have a high level of cable diameter range taking). In certain examples, the cable diameter range taking can be provided without requiring the use of grease.

Another aspect of the present disclosure relates to a sealing device including a cable seal defining a cable pass-through location for passing a cable through a thickness of the cable seal. The cable seal includes lips that can be removed from a remaining portion of the cable seal to reduce an overall volume of the cable seal. The lips can be provided at an exterior of the cable seal or at an interior of the cable seal.

Another aspect of the present disclosure relates to a cable sealing device including a cable seal defining a cable pass-through location for passing a cable through a thickness of the cable seal. The thickness extends between front and rear sides of the cable seal. The cabling sealing device also includes front and rear sealant containment walls respectively positioned at the front and rear sides of the cable seal. The cable pass-through location includes a cable port that extends through the thickness of the cable seal. The cable port defines major cross-dimensions adjacent the front and rear sides of the cable seal and a minor cross-dimension at an intermediate location between the front and rear sides. In one example, the intermediate location is centered between the front and rear sides. In certain examples, the cable port can have a curved tapered configuration, a linear tapered configuration, or a stepped configuration. In certain examples, the front and rear sealant containment walls can define cable opening that align with the cable port which have cross-dimensions that are equal to or larger than the major cross-dimensions of the cable port.

A further aspect of the present disclosure relates to a cable sealing device including a cable seal defining a cable pass-through location for passing a cable through a thickness of the cable seal. The thickness extends between front and rear sides of the cable seal. The cable seal defines a plurality of volume compensating holes that extend at least partially through the thickness of the cable seal. Preferably, the volume compensating holes are not configured for receiving cables, and instead are provided for providing volume compensation when cable sealant is displaced by a cable routed through the cable pass-through location. The volume compensating holes can extend only partially through the thickness of the cable seal, or completely through the thickness of the cable seal. In certain examples, a filler such as foam can be provided within the volume compensating openings.

Still another aspect of the present disclosure relates to a cable sealing device including a cable seal defining a cable pass-through location for passing a cable through a thickness of the cable seal. The thickness extends between front and rear sides of the cable seal. A resilient material is embedded in the cable seal. The resilient material can be compressed when a cable is routed through the cable pass-through location to provide volume compensation. In certain examples, the resilient material can include a plurality of discrete volumes dispersed within the seal. Optionally, the resilient material can include a foam.

A further aspect of the present disclosure relates to a cable sealing device including a cable seal defining a cable pass-through location for passing a cable through a thickness of the cable seal. The thickness extends between front and rear sides of the cable seal. A plurality of discrete closed gas cells are enclosed within an interior of the cable sealing insert. In an optional example, the discrete closed gas cells include air bubbles.

A further aspect of the present disclosure relates to a cable sealing device including a cable sealing insert having a length, a width, and a thickness. The cable sealing insert has first and second opposite ends separated by the length of the cable sealing insert. The first and second ends have end surfaces that extend along the width and the thickness of the cable sealing insert. The cable sealing insert also includes first and second opposite sides separated by the width of the cable sealing insert. The first and second sides have side surfaces that extend along the length and the thickness of the cable sealing insert. The cable sealing insert also includes major front and rear sides separated by the thickness of the cable sealing insert. The major front and rear sides respectively include front and rear surfaces that extend along the width and the length of the cable sealing insert. The side surfaces and the end surfaces define a perimeter shape of the cable insert. The cable sealing insert defines at least one cable pass-through location for routing a cable through the thickness of the cable sealing insert. In one example, the cable sealing insert optionally includes recesses at the first and second sides. The recesses can be configured for facilitating inserting the cable sealing insert into a pocket of an enclosure and for providing volume compensation for taking up volume corresponding to the volume of the cable sealing insert displaced by a cable routed through the cable pass-through location. In certain examples, the cable sealing device can optionally include a removable liner that adheres to the first and second opposite sides of the cable sealing insert for facilitating inserting the cable sealing insert into a pocket of an enclosure. The removable liner can be removed from the cable sealing insert once the cable sealing insert has been inserted into the pocket. In certain examples, the first end of the cable sealing insert can optionally be rounded in an orientation that extends across the thickness of the cable sealing insert. The rounding of the cable sealing insert can provide space within a pocket of an enclosure for allowing for volume compensation. In certain examples, the cable sealing insert can optionally include sealing protrusions located at the second end of the cable sealing insert that project outwardly from a main body of the cable sealing insert in an orientation that extends along the width of the cable sealing insert. The sealing protrusions can fit within notches defined by a pocket for receiving the cable sealing insert. In certain examples, by installing the sealing protrusions within notches effective sealing can be provided at a triple point of an enclosure where a perimeter sealing gasket extends across the second end of the cable sealing insert and across the sealing protrusions.

Another aspect of the present disclosure relates to a cable sealing device including a cable seal having a removable liner that adheres to an exterior of the cable seal. The removable liner facilitates inserting the cable seal into a pocket of an enclosure. Once the cable seal has been inserted into the pocket, the liner can be removed. In one optional example, the liner can be removed in separate pieces.

A further aspect of the present disclosure relates to a cable sealing device including a cable seal defining a cable pass-through location for passing a cable through a thickness of the cable seal. The thickness extends between front and rear sides of the cable seal. The cable sealing device also includes front and rear sealant containment walls respectively secured at the front and rear sides of the cable seal. The cable seal and the front and rear containment walls are constructed and arranged to provide a wrap-around configuration for allowing a cable to be inserted laterally into the cable pass-through location. The front and rear containment walls and the cable seal define an access slit that extends through the thickness of the cable seal from the cable pass-through location to a perimeter of the perimeter seal. The front and rear sealant containment walls and the cable seal also define a plurality of hinge slits that extend from the cable pass-through location hinge locations positioned inside the perimeter shape. The access slit and the hinge slits allow a flap portion of the cable seal to be moved relative to a main body portion of the cable seal between a closed position and an open position. A cable can be laterally inserted into the cable pass-through location when the flap is in the open position. With the cable position at the cable pass-through location, the flap portion can be wrapped around the cable to enclose the cable in the cable pass-through location by moving the flap portion from the open position to the closed position. The front and rear sealant containment walls include sealant containment fingers that can flex radially to accommodate larger cables. The radial flexing of the containment fingers is relative to a central cable axis location defined through the cable pass-through location.

A further aspect of the present disclosure relates to a cable sealing device including a cable seal defining a cable pass-through location for passing a cable through a thickness of the cable seal. The thickness extends between front and rear sides of the cable seal. The cable sealing device also includes front and rear sealant containment walls respectively secured at the front and rear sides of the cable seal. The front and rear sealant containment walls include sealant containment fingers that can flex radially to accommodate larger cables. The sealant containment fingers have hooked inner ends that embed within the cable seal and cooperate to define a pass-through opening about the central axis of the cable pass-through location. The fingers also include outer ends that are spaced radially outwardly from the inner ends with respect to the central axis of the cable pass-through location. The fingers can flex about the outer ends and/or about their finger lengths to allow the inner ends to move radially relative to the central axis of the cable pass-through location.

Any of the cable seals or cable inserts disclosed herein can optionally have a composition having a residual hardness in the range of 20-80 g after one hour, and/or a compression set less than 10% after 100 hours, and/or a resistance to extrusion having a measured volume less than 0.5 cubic centimeters, and/or an elongation to failure of at least 300%, and/or an oil bleed out of less than 15% by weight measured at 500 hours.

BRIEF DESCRIPTION OF THE DRAWINGS

FIG. 15 is a front view of a cable sealing device in accordance with the principles of the present disclosure having removable lips at an exterior of the device;

FIG. 16 is a side view of the cable sealing device of FIG. 15

DETAILED DESCRIPTION

In the following detailed description, reference is made to the accompanying drawings showing by way of illustration enclosures and cable sealing devices. It is to be understood that other embodiments may be utilized and structural or logical changes may be made without departing from the scope of the present disclosure. The following detailed description, therefore, is not to be taken in a limiting sense.

Any range recited herein is to be understood to include any integer within that range and fractions thereof, such as one tenth and one hundredth of an integer, unless otherwise indicated.

Aspects of the present disclosure relate to a cable sealing device comprising a cable sealing insert made of a material having a Shore 000 hardness in the range of 20-80 or 30-60 and a compression set less than or equal to 10 percent, less than or equal to 15 percent, or less than or equal to 20 percent. These combinations of Shore 000 hardness and compression set are especially advantageous. These combinations of Shore 000 hardness and compression set impart appropriate expandability to the cable sealing insert such that the cable sealing insert can accommodate fiber optic cables having different diameters. However, these combinations of Shore 000 hardness and compression set also limit deformation of the cable sealing insert such that it does not require full containment as various sealing gels presently require. Therefore, by these combinations of Shore 000 hardness and compression set, the cable sealing insert can be freely inserted into and removed from a seal mounting pocket of an enclosure.

Aspects of the present disclosure also relate to an enclosure for mounting a plurality of cable sealing devices within seal mounting pockets.

Figure 1:
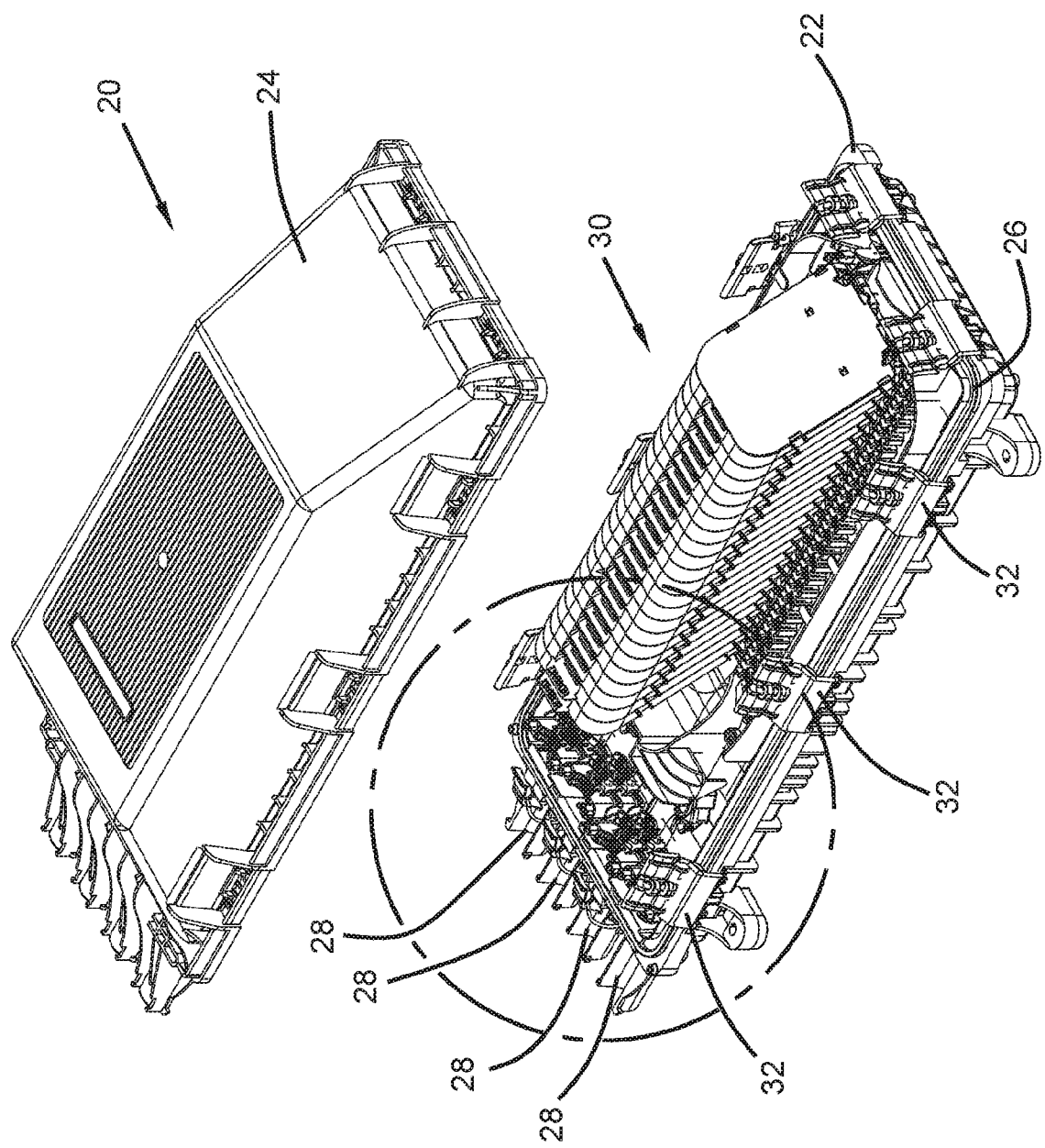
FIG. 1 depicts an embodiment of an enclosure having a housing including a base and a removable cover used to mount a plurality of cable sealing devices.
Figure 2:
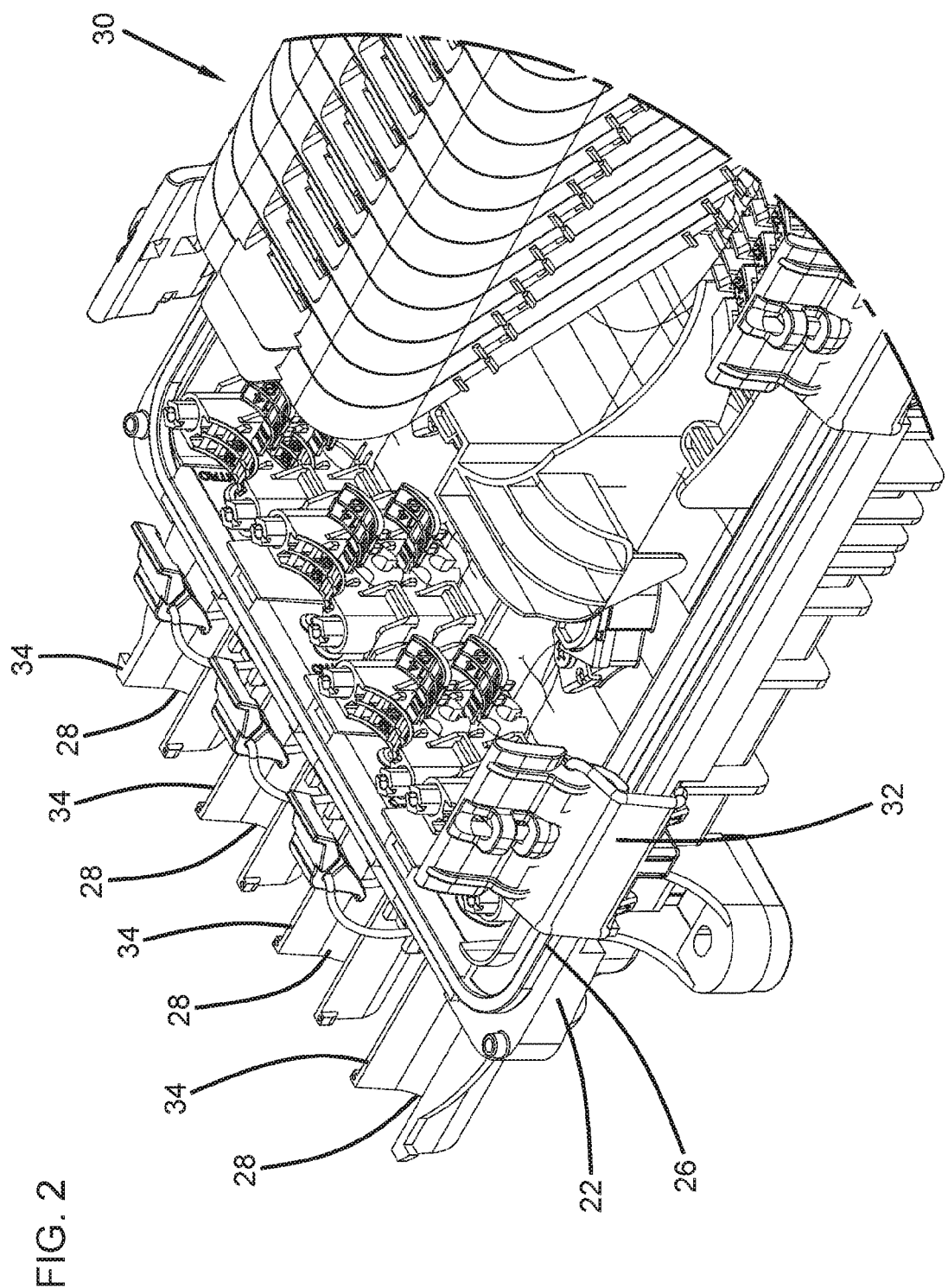
FIG. 2 is an enlarged view of a portion of the base shown in FIG. 1 having a plurality of seal mounting pockets.

FIGS. 1-2 illustrate an embodiment of an enclosure 20 in which a plurality of cable sealing devices can be mounted. The enclosure includes a housing formed by a base 22 and a cover 24. The cover 24 is removable from the base 22. The base 22 and the cover 24 cooperate to define an interior when the cover 24 is mounted to the base 22. The enclosure also includes a perimeter seal 26. The perimeter seal 26 extends about a perimeter of the housing and provides sealing at an interface between the base 22 and the cover 24. The perimeter seal 26 can be made of, for example, rubber. In embodiments, the base 22 defines a perimeter groove for receiving the perimeter seal.

Latches 32 can be used to fasten the base 22 to the cover 24. A variety of types of latches are contemplated (e.g., snap lock, latches including screws, bolts, etc.).

The base 22 defines seal mounting pockets 28 in which cable sealing devices can be mounted. The seal mounting pockets 28 are formed by and separated by divider walls 34. The seal mounting pockets 28 generally have a shape that is complementary to the cable sealing devices. The seal mounting pockets 28 are more easily seen in FIG. 2. Although a variety of shapes of seal mounting pockets are contemplated, the seal mounting pockets 28 depicted in FIGS. 1 and 2 are U-shaped.

The enclosure 20 can contain a variety of components commonly included in fiber optic enclosures (e.g., splice trays, passive optical splitters, wave length division multiplexers, etc.). As an example, a plurality of splice trays 30 are shown in the enclosure 20 of FIGS. 1 and 2.

Figure 8:
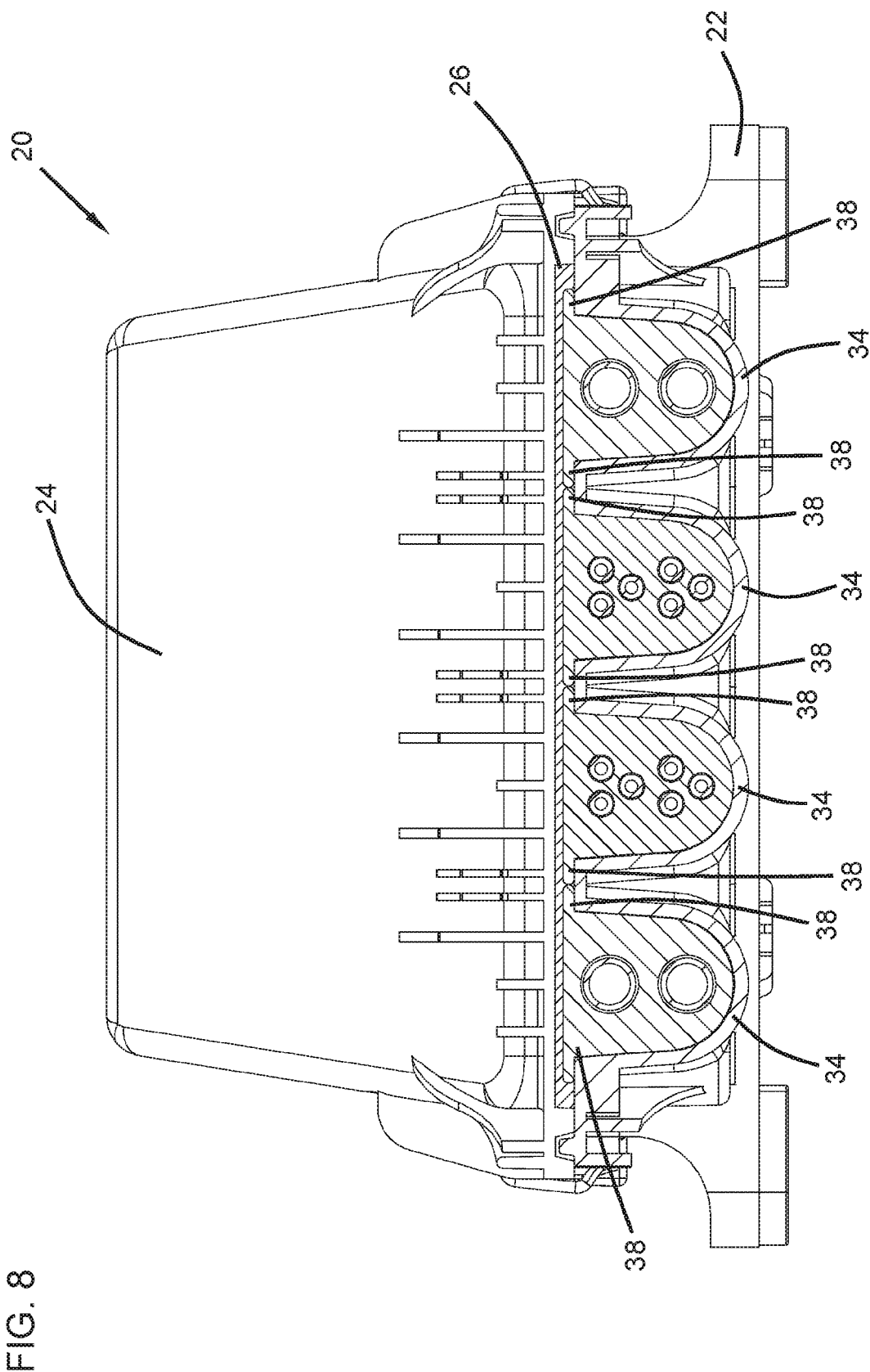
FIG. 8 is a section view of the embodiment of the enclosure of FIG. 3 with the plurality of cable sealing devices mounted therein.

FIGS. 3-5 and 8 show how cable sealing devices 36 mount within the seal mounting pockets 28 of the base 22. In particular, the complementary shape of each seal mounting pocket 28 fits a respective cable sealing device 36. When the cable sealing devices 36 are mounted in the seal mounting pockets 28, side protrusions 38 of adjacent cable sealing devices 36 extend over top ends of the divider walls 34. These side protrusions 38 can contact one another as shown. This relationship between the mounted cable sealing devices 36 is best seen in FIG. 8, which is a section view of the assembled enclosure 20. However, the side protrusions 38 do not contact one another in alternative embodiments. When the cable sealing devices 36 are mounted in the seal mounting pockets 28, the perimeter seal 26 can also extend over top ends of the cable sealing devices 36 as shown in FIG. 8.

In embodiments, a cable sealing device 36 includes a cable sealing insert defining a perimeter profile. The cable sealing insert includes a main body. The perimeter profile of the cable sealing insert extends along a first axis between top and bottom ends of the main body. The perimeter profile of the cable sealing insert also includes first and second opposite sides of the main body that extend between the top and bottom ends of the main body. The perimeter profile of the cable sealing insert can further include side protrusions positioned adjacent the top end of the main body that project outwardly from the first and second sides of the main body. Alternatively, the perimeter profile of the cable sealing insert can include upward protrusions that project upwardly from the top end of the main body near the first and second sides of the main body. As another alternative, the perimeter profile of the cable sealing insert can include a single protrusion (e.g., bump) extending from the top end of the main body at approximately the center of the top end. The main body of the cable sealing insert further has major front and back sides separated by a thickness of the main body. The main body defines at least one cable pass-through location that extends through the thickness of the main body between the major front and back sides of the main body.

The enclosure can comprise first and second cable sealing devices having different numbers of cable pass-through locations. The cable pass-through locations can be cable pass-through openings. The enclosure can comprise first and second cable sealing devices having different sized cable pass-through openings.

In embodiments, the enclosure does not include a spring for applying stored energy to the cable sealing devices. In embodiments, the housing provides only edge containment of the cable sealing inserts.

In embodiments, the bottom end of the main body is rounded. In embodiments, the top end of the main body is flat. In embodiments, the first and second sides of the main body diverge as the first and second ends extend toward the top end of the main body. In embodiments, the cable pass-through location is a cable pass-through opening defined by the main body.

One or a plurality of cable pass-though openings can be defined by the main body. In embodiments, at least one cable-pass through opening comprises a hole and a slit. In embodiments, at least one cable-pass through opening comprises a hole without a slit. In embodiments, at least one cable-pass through opening comprises a slit without a hole.

It will be appreciated that the cable pass-through opening can be constructed to accommodate different sized diameter fiber optic cables. For example, in embodiments, the cable sealing insert is constructed such that the cable pass-through opening can accommodate cables across a cable diameter range of at least 3 millimeters. In embodiments, the cable sealing insert is constructed such that the cable pass-through opening can accommodate cables across a cable diameter range of at least 4 millimeters. In embodiments, the cable sealing insert is constructed such that the cable pass-through opening can accommodate cables across a cable diameter range of at least 5 millimeters. Advantageously, in embodiments, the cable sealing insert does not require cable wrap for accommodating cables across the cable diameter range and does not require grease for sealing.

FIGS. 9-12 depict exemplary cable sealing devices 36a-36d. Each of the exemplary cable sealing devices 36a-36d is a one-piece molded cable sealing insert including a main body 40. The cable sealing insert defines a perimeter profile having an elongate length that extends along a first axis A-A between a first end 42 and a second end 42 of the main body 40. As shown in FIGS. 9-12, the first end 42 of the main body 40 is rounded and the second end 44 of the main body 40 is flat. The perimeter profile of the cable sealing insert also includes a first opposite side 46 and a second opposite side 48 of the main body 40 that extends between the first end 42 and the second end 44 of the main body 40. In the exemplary cable sealing devices 36a-36d, the first and second opposite sides 46, 48 are oriented to diverge away from one another as the first and second sides 46, 48 extend toward the second end 44 of the main body 40. In this manner, the main body 40 has a tapered configuration.

The perimeter profile of the cable sealing insert also includes side protrusions 38 positioned adjacent the second end 44 of the main body 40. The side protrusions 38 project outwardly from the first and second opposite sides 46, 48 of the main body 40.

The main body 40 of the cable sealing insert also has a major front side 50 and a major back side 52 separated by a thickness of the main body 40. The main body 40 of the various cable sealing devices 36a-36d fully defines cable pass-through openings that extend through the thickness of the main body 40 between the major front side 50 and the major back side 52 of the main body 40. In the embodiments depicted FIGS. 9-12, the side protrusions 38 also extend across the thickness of the main body 40 between the major front side 50 and the major back side 52 of the main body 40.

Figure 9:
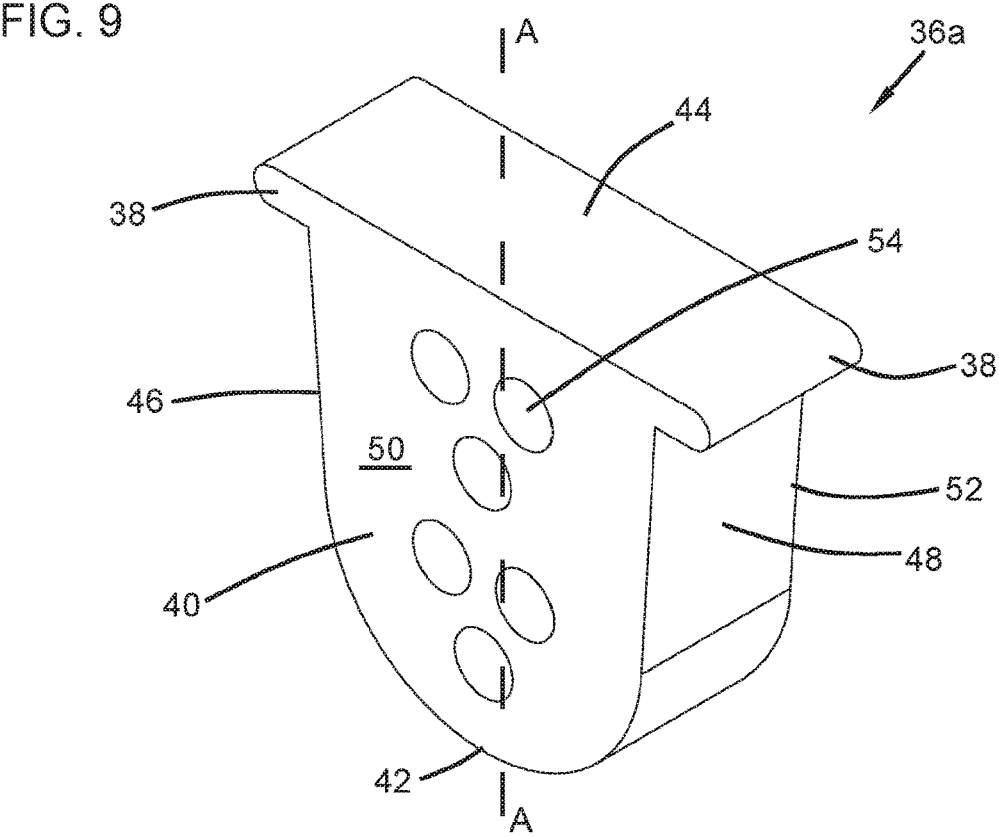
FIG. 9 shows a perspective view of an embodiment of a cable sealing device.
Figure 10:
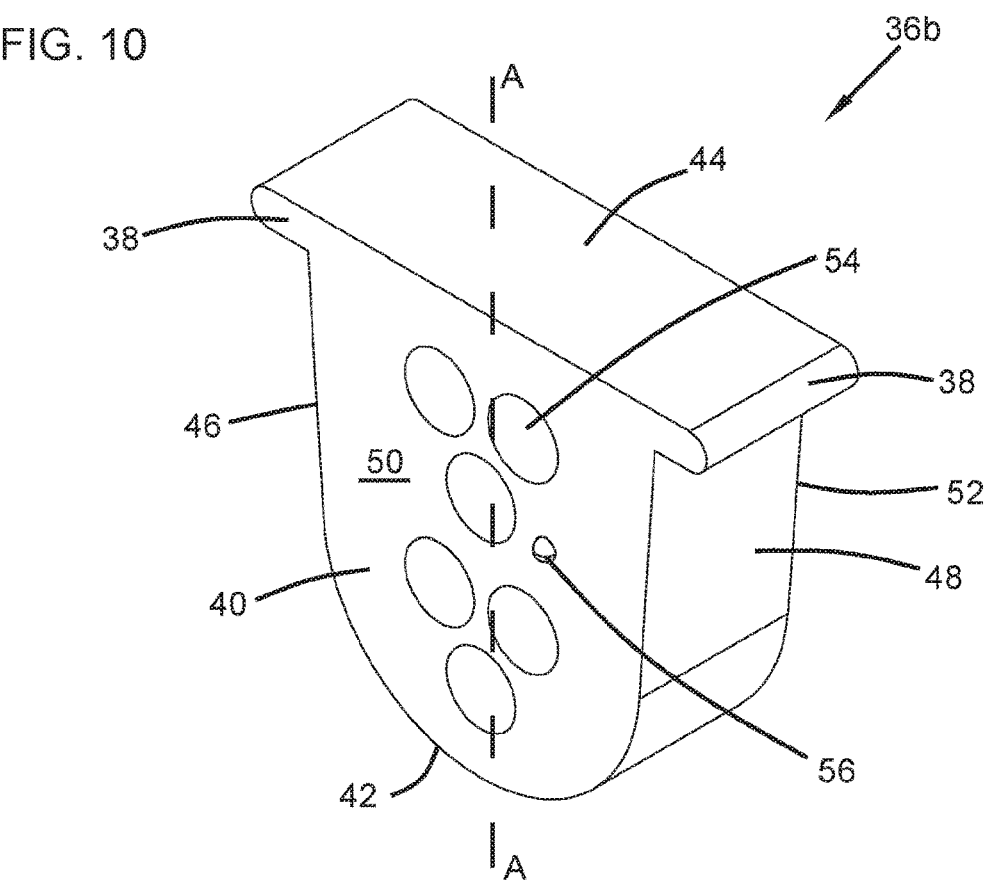
FIG. 10 shows a perspective view of another embodiment of a cable sealing device.
Figure 11:
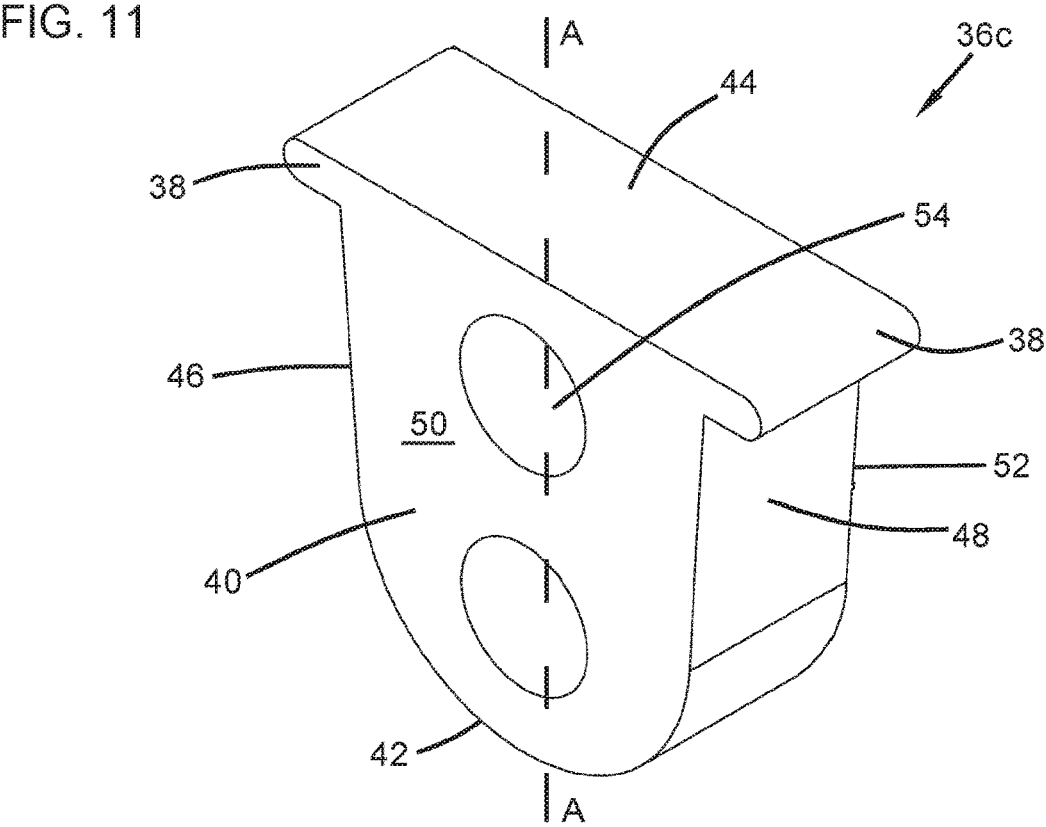
FIG. 11 shows a perspective view of an alternative embodiment of a cable sealing device.
Figure 12:
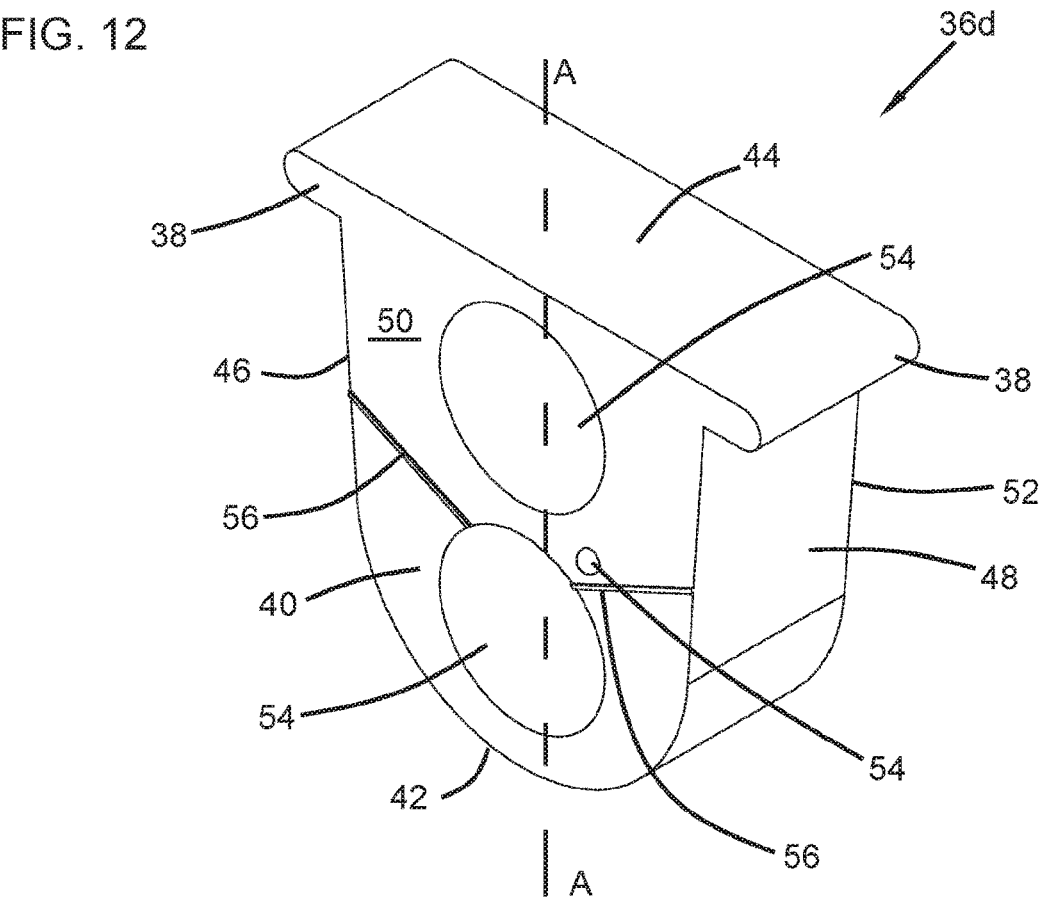
FIG. 12 shows a perspective view of yet another embodiment of a cable sealing device.

In FIG. 9, six cable pass-through openings 54 in the form of holes are depicted. In FIG. 11, two cable pass-through openings 54 in the form of holes are provided. It should be appreciated that the cable pass-through openings 54 can take on a variety of forms. For example, FIG. 10 shows two types of cable pass-through openings. The main body 40 of the cable sealing device 36b includes both cable pass-through openings 54 in the form of holes and a cable pass-through opening that is a slit 56. FIG. 12 depicts two types of cable pass-through openings that are integrated. In particular, FIG. 12 shows slits 56 originating at and extending from a cable pass-through opening 54 in the form of a hole. Slits 56 connected to a cable pass-through opening 54 in the form of a hole are useful for inserting fiber optic cables into the cable pass-through opening 54 prior to installing the cable sealing device into a seal mounting pocket 28 of the enclosure 20 without having the thread the fiber optic cable through the cable pass-through opening 54.

Figure 3:
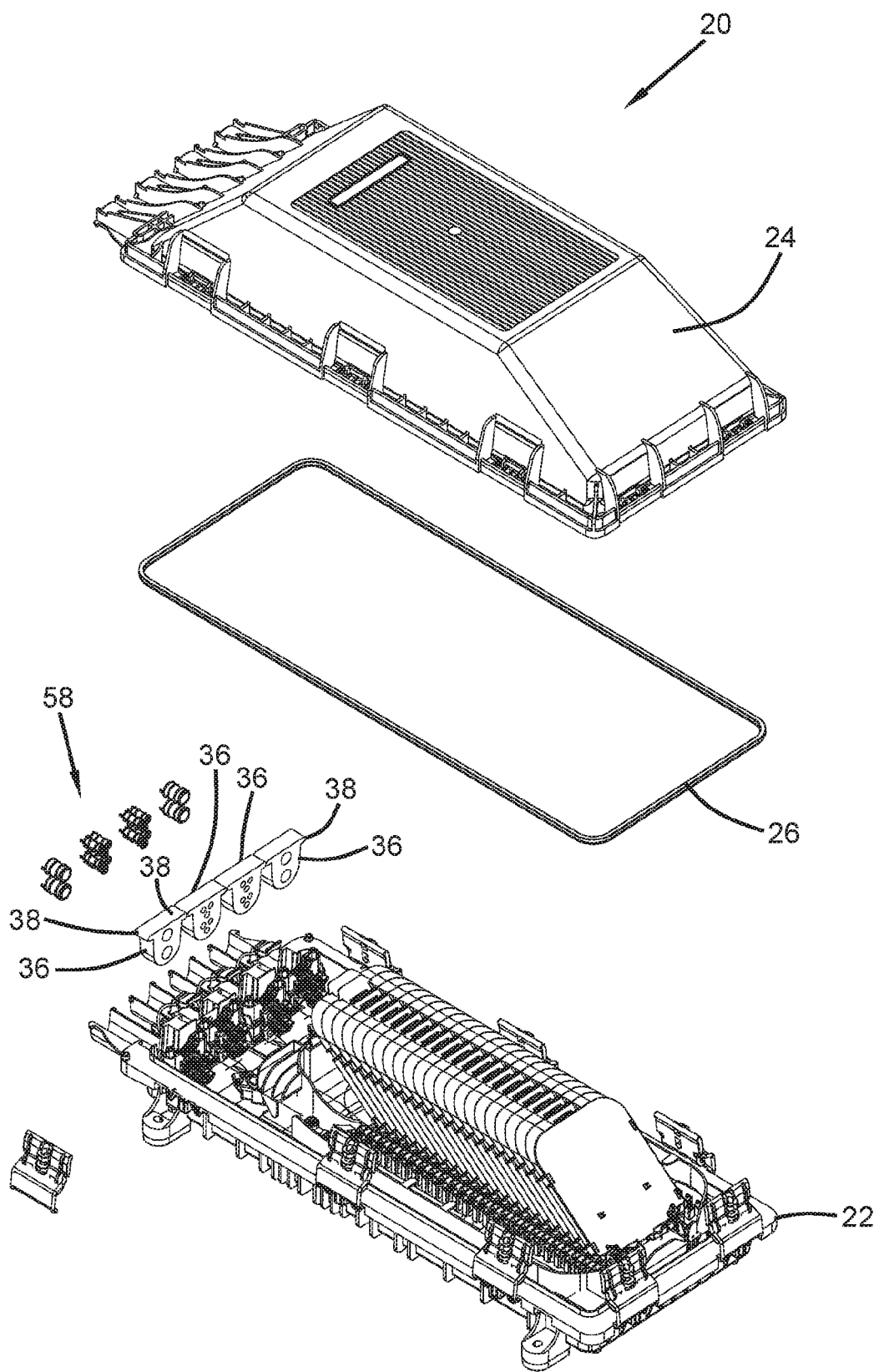
FIG. 3 is an exploded view of an embodiment of an enclosure with a plurality of cable sealing devices mounted therein.
Figure 4:
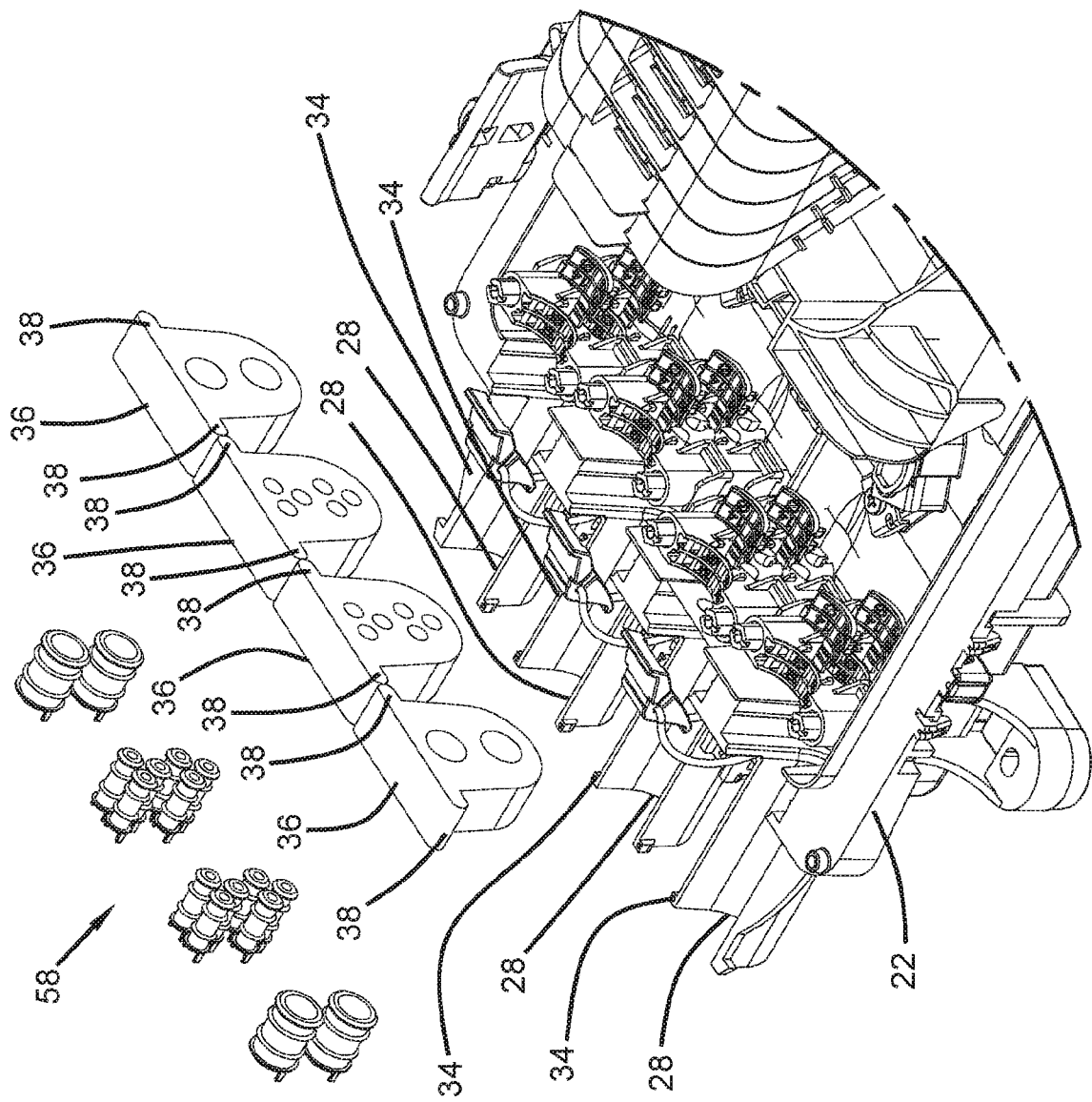
FIG. 4 is an enlarged, exploded view of a portion of a base of the embodiment of the enclosure shown in FIG. 3.
Figure 5:
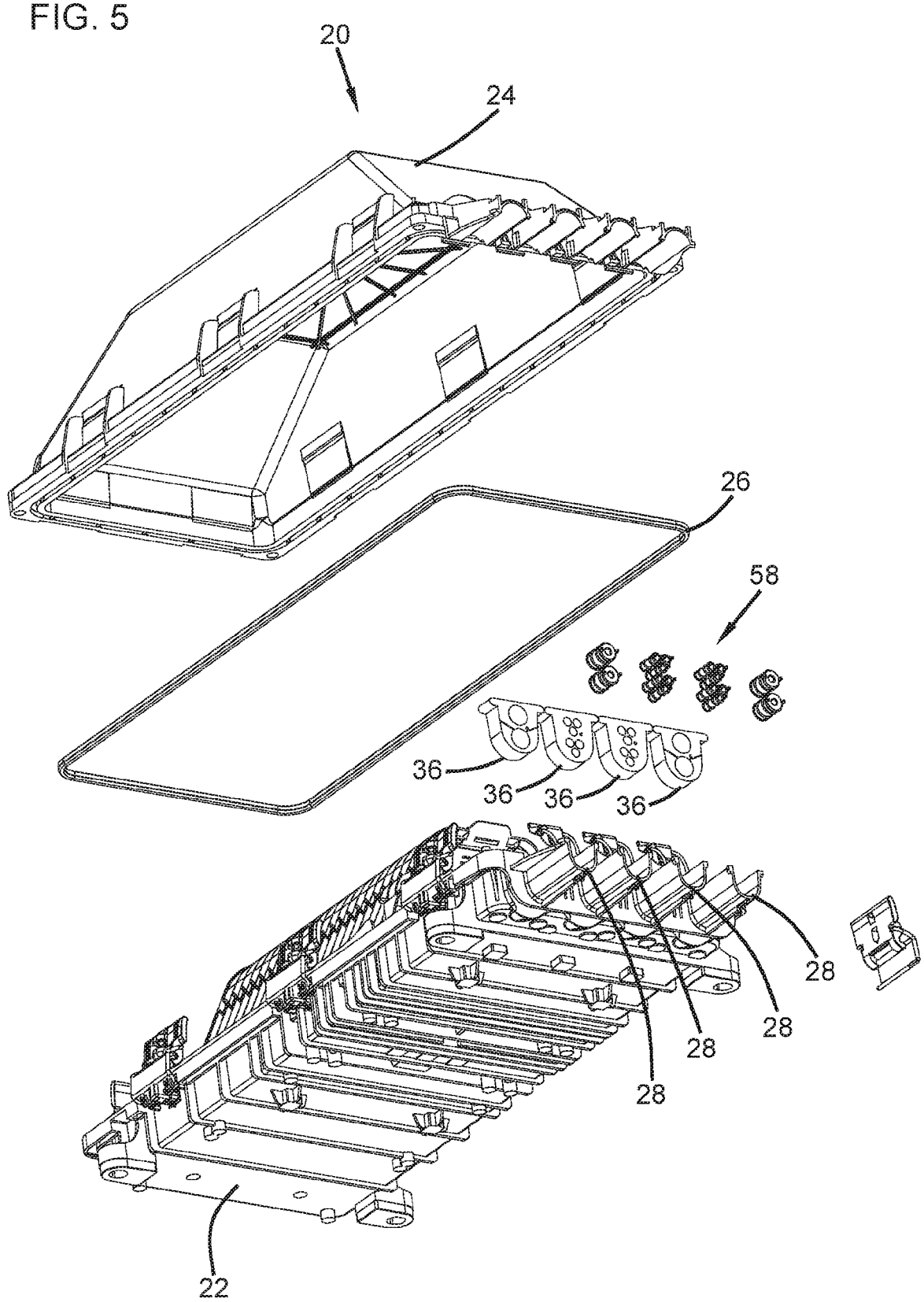
FIG. 5 is an alternative, exploded view of the embodiment of the enclosure of FIG. 3.

As shown in FIGS. 3-5, plugs 58 can be inserted into cable pass-through openings 54, when the cable pass-through openings 54 are not in use (i.e., when the cable pass-through openings are not occupied by a fiber optic cable).

Figure 6:
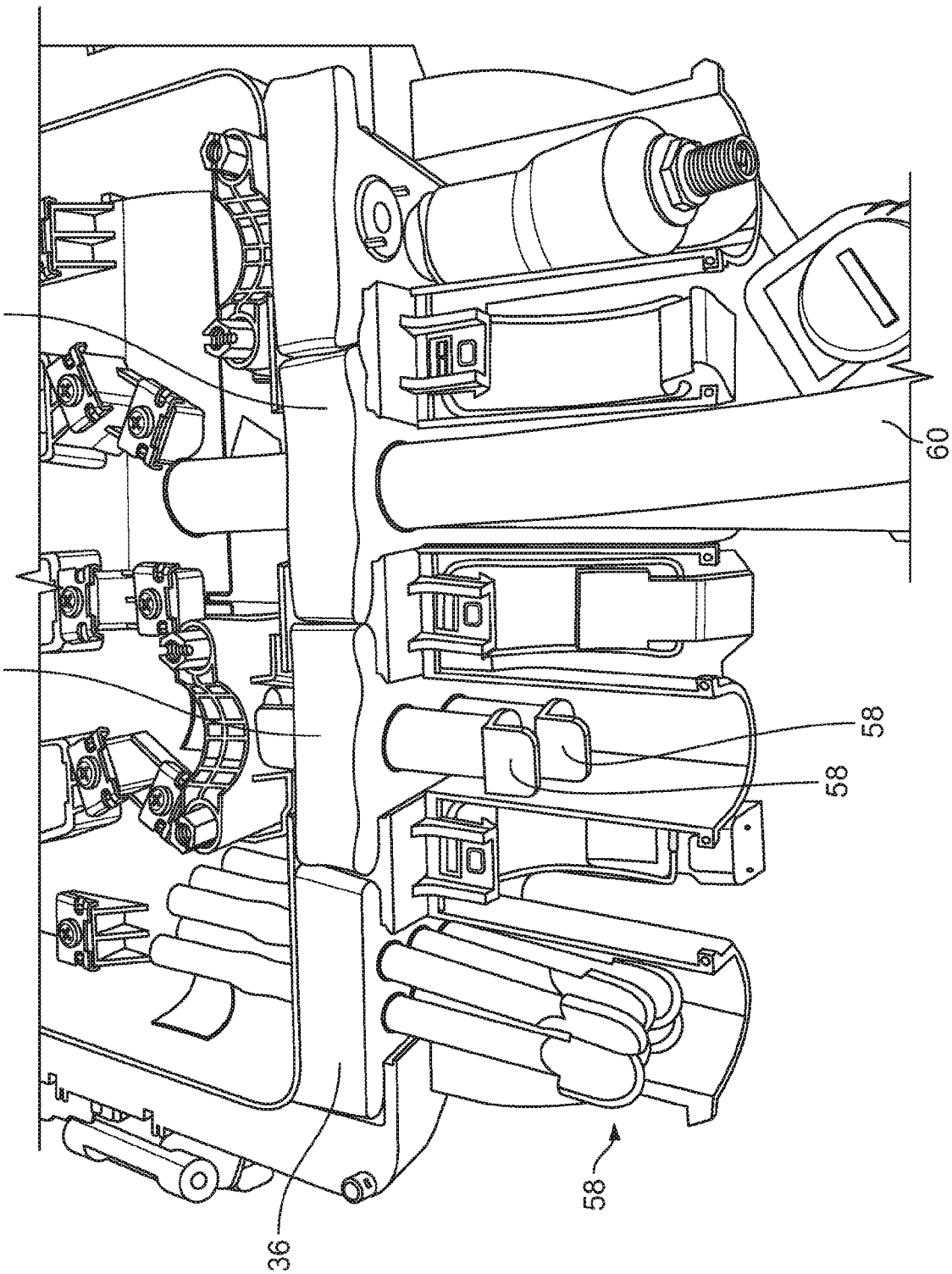
FIG. 6 shows plugs inserted within and a fiber optic cable sealed by cable sealing devices in an embodiment of an enclosure.
Figure 7:
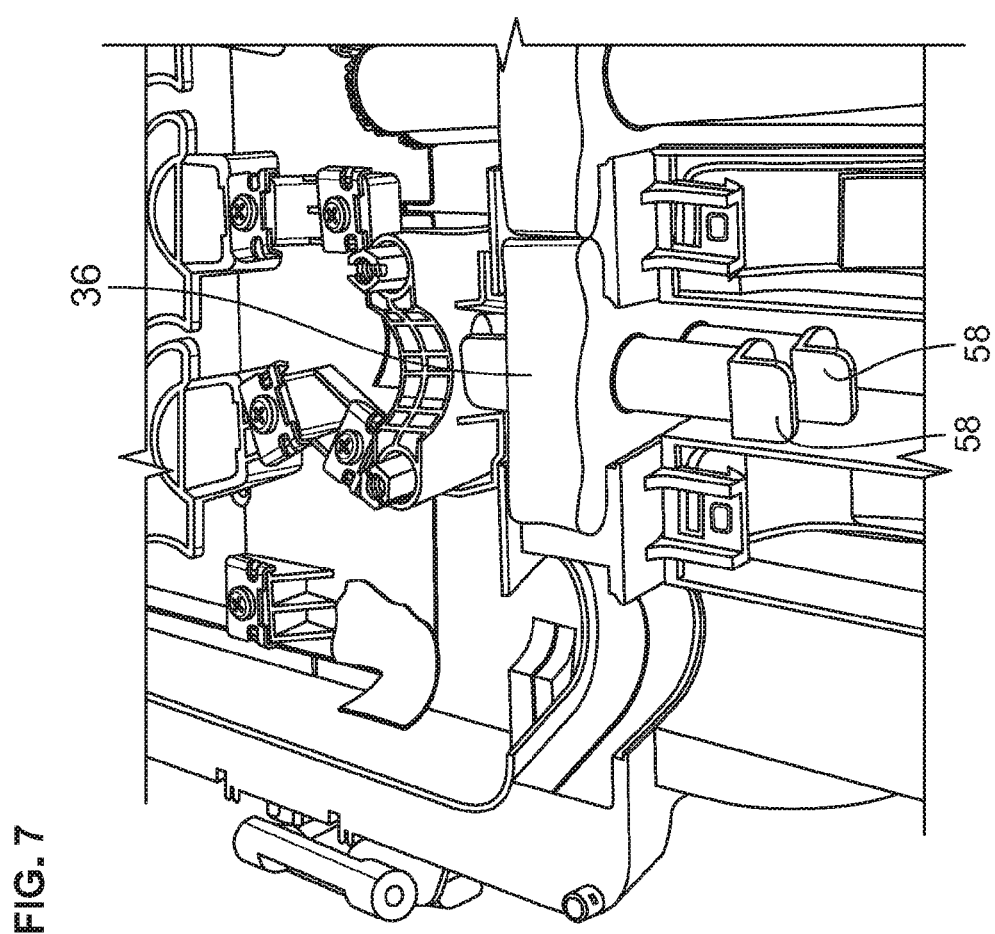
FIG. 7 shows a plug inserted within a cable sealing device in an embodiment of an enclosure.

Turning to FIGS. 6 and 7, the cable pass-through openings can accommodate either a plug 58 or a fiber optic cable 60. FIGS. 6 and 7 show plugs 58 extending through cable pass-through openings that are not in use. The plugs 58 are removed prior to inserting a fiber optic cable through the cable pass-through opening. FIG. 6 also shows a cable pass-through opening in use in which a fiber optic cable 60 extends through the cable pass-through opening and is sealed by the cable sealing device 36.

Figure 13:
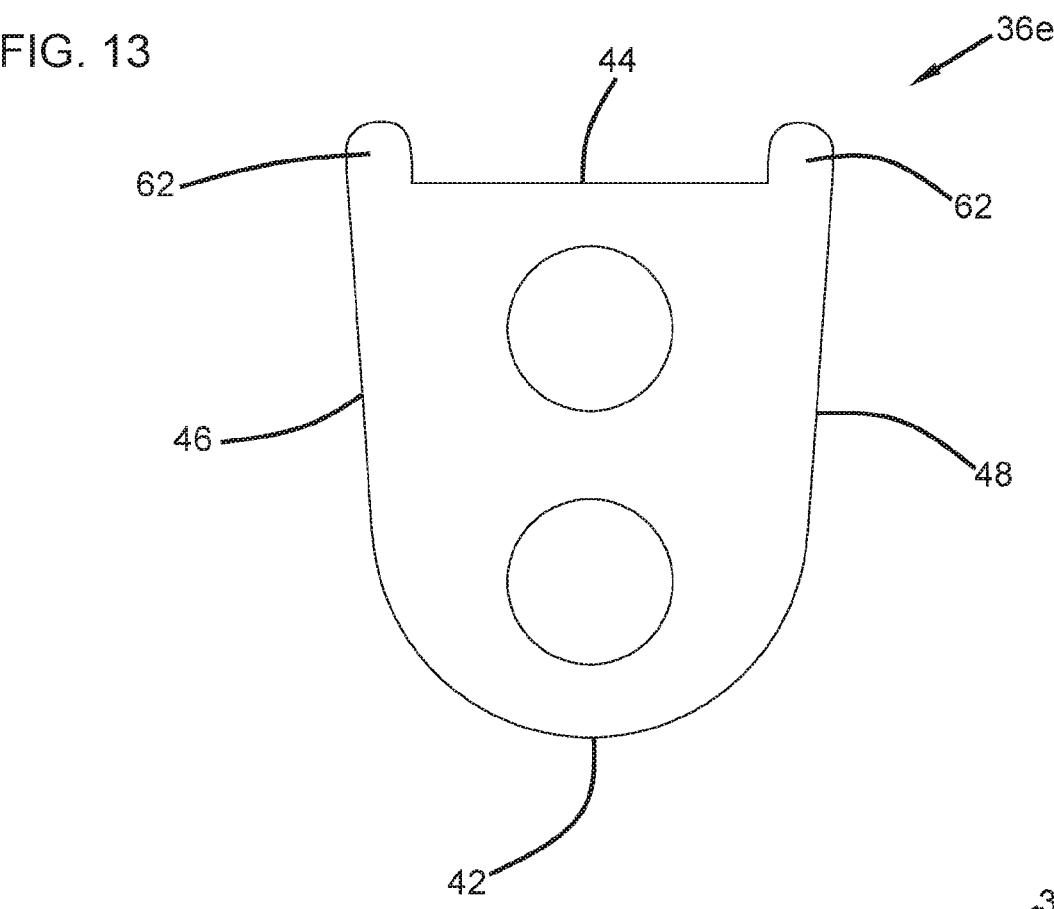
FIG. 13 shows a front view of an embodiment of a cable sealing device.
Figure 14:
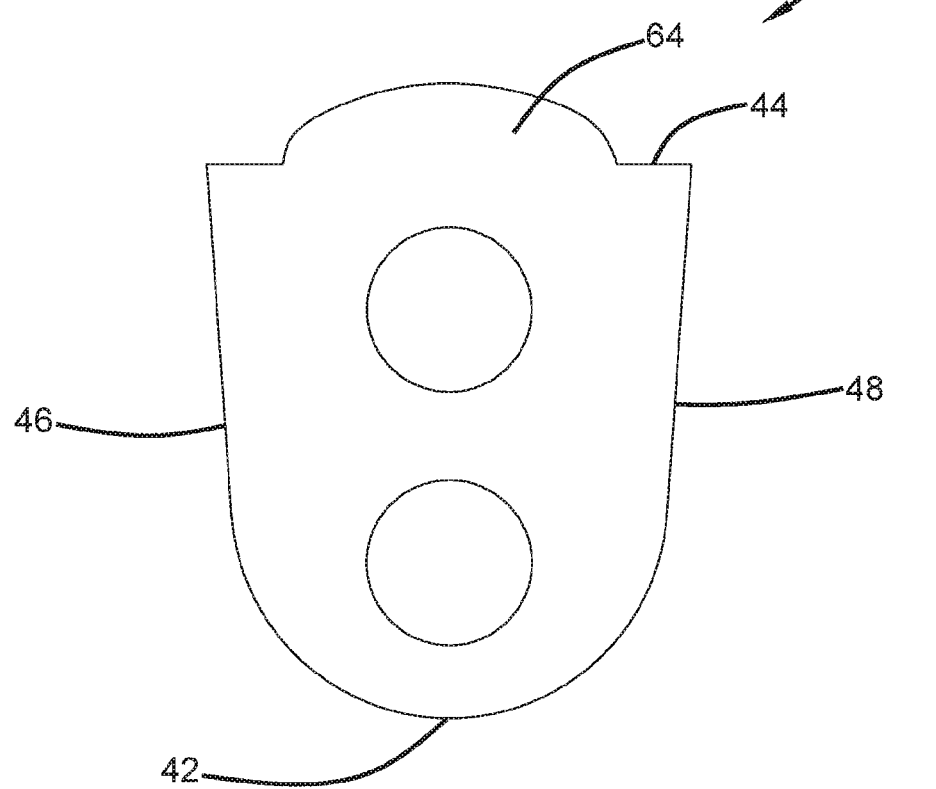
FIG. 14 shows a front view of another embodiment of a cable sealing device.

FIG. 13 illustrates an embodiment of a cable sealing device 36e where the perimeter profile of the cable sealing insert includes upward protrusions 62 that project upwardly from the top end 44 of the main body near the first and second sides 46, 48 of the main body. FIG. 14 illustrates another embodiment of a cable sealing device 36f where the perimeter profile of the cable sealing insert includes a single protrusion 64 extending from the top end 44 of the main body at approximately the center of the top end 44.

In embodiments, the cable sealing device includes one or more support structures either inside or outside the cable sealing insert that are made out of plastic or hard rubber (i.e, greater than 50 Shore A) to help contain and/or mechanically support the cable sealing insert material (e.g., a dry silicone gel or a polyurethane gel). The support structure can be finger-like structures inside the cable sealing insert extending outwardly from the perimeter of the cable pass-through opening. The support structure can be inside the cable sealing insert and extend along one or more edges of the cable sealing insert. The support structure can include a structure outside the cable sealing insert positioned adjacent to a portion of the major front and back sides of the cable sealing insert.

In embodiments, the side protrusions have a height (in the direction between the first end of the main body and the second end of the main body) of 2 mm to 10 mm. In embodiments, the side protrusions project outwardly a distance of 2 mm to 10 mm from the first and second opposite sides of the main body. In embodiments, side protrusions or upward protrusions have a depth (in the direction between the major front side and the major back side of the main body) equal to the thickness of the main body between the major front side and the major back side. Alternatively, in embodiments, side protrusions or upward protrusions have a depth of at least 50% of the thickness of the main body. The thickness of the main body can be, for example, 10 mm to 20 mm (e.g., 15 mm).

FIGS. 15 and 16 depict another cable sealing device 36g in accordance with the principles of the present disclosure. The cable sealing device 36g is adapted to be mounted in a pocket of an enclosure (e.g., within the seal mounting pocket 28 of the enclosure 20). The cable sealing device 36g includes a cable seal 102 constructed of a material such as a cable sealing gel of the type described herein. The cable seal 102 has a length L, a width W and a thickness T. The cable seal 102 includes first and second opposite ends 104, 106 separated by the length L of the cable seal 102. The first and second ends 104, 106 respectively include end surfaces 108, 110 that extend along the width W and the thickness T of the cable seal 102. The cable seal 102 also includes first and second opposite sides 112, 114 that extend along the length L and the thickness T of the cable seal 102. The cable seal further includes major front and rear sides 116, 118 separated by the thickness T of the cable seal 102. The major front and rear sides 116, 118 respectively include front and rear surfaces 120, 122 that extend along the width W and the length L of the cable seal 102. The side surfaces 108, 110 and the end surfaces 120, 122 define a perimeter shape of the cable seal 102. The cable seal 102 defines at least one cable pass-through location 124 for routing a cable through the thickness T of the cable seal 102. In the depicted example, the cable seal 102 includes two of the cable pass-through locations 124 spaced apart along the length L of the cable 102. In the depicted example, the cable pass-through locations 124 are depicted as including cable ports that extend through the thickness T of the cable seal 102.

In the depicted example of FIGS. 15 and 16, the first end 104 defined by the end surface 108 is rounded (e.g., curved) in an orientation that extends across the width W of the cable seal 102. In contrast, the second end 106 defined by the ends surface 110 is flat (e.g., not curved, planar) in the orientation that extends along the width W of the cable seal 102.

The cable seal 102 includes lips 126 (e.g., at least two lips or at least 3 lips) that can be removed from a remaining portion 128 (e.g., a main body portion) of the cable seal 102 to reduce an overall volume of the cable seal 102. It will be appreciated that the lips 126 can be removed to provide volume compensation for accommodating cables through the cable pass-through locations 124. It will be appreciated that the volume of the cable seal 102 displaced by a given cable routed through one of the cable pass-through locations 124 is directly dependent upon the size of the cable. Thus, larger cables will displace more material of the cable seal than smaller cables. Since the pocket of the enclosure for receiving the cable seal 102 may have a pre-defined volume, it is desirable to be able to adjust the volume of the cable seal 102 depending upon the size of the cables routed therethrough. If the volume of the cable seal 102 when one or more cables are passed therethrough is too large for the pocket, the cable seal 102 may interfere with the effective sealing of the enclosure by the perimeter gasket between the housing pieces of the enclosure, and may also interfere with effective sealing provided by adjacent cable seals. The lips 126 can be selectively removed, as needed, after the full preparation and installation of the cable seal 102 with the cable or cables mounted therein. After installation evaluation, the correct number of lips 126 can be removed to bring the seal 102 in the correct position with respect to one or more features within the enclosure. Example features can include sealing planes and triple points within the enclosure. It is also desirable to effectively equalize the heights of multiple seals mounted adjacent to one another within an enclosure.

As indicated above, the lips 126 can be removed from the remaining portion 128 of the cable seal 102 to reduce an overall volume of the cable seal 102. The lips 126 can be removed in the field after the cable seal 102 has been mounted within a pocket of an enclosure with one or more cables installed through the cable pass-through locations 124. The lips 126 can be torn away from the remaining portion 128 of the cable seal 102. In other examples, the lips 126 may be cut from the remaining portion 128. In the depicted example of FIGS. 15 and 16, the lips 126 are separated from one another by slits 130. Additionally, in an example of the FIGS. 15 and 16, the lips 126 are provided at an exterior of the cable seal 102. For example, the lips 126 are located at the second end 106 of the cable seal 102 and define the end surface 110 of the second end 106 of the cable seal 102. The outermost one of the lips 126 defines the end surface 110 and the lips 126 extend along the perimeter shape of the cable seal 102 at least adjacent the second end 106. In the depicted example, the lips 126 are parallel with respect to one another and are formed by parallel strips of sealant material. As shown best at FIG. 16, the slits 130 extend at least partially through the thickness T of the cable seal 102. As depicted at FIG. 16, the slits 130 extend only partially through the thickness T of the cable seal 102. The lips have lengths L that extend along the width W of the cable seal 102, thicknesses that extend along the length L of the cable seal 102, and widths W that extend along the thickness T of the cable seal 102.

The lips 126 are unitarily connected with the remaining portion 128 of the cable seal 102 prior to being removed from the cable seal 102. The remaining portion 128 of the cable seal 102 is a main body of the cable seal 102, and the lips 126 are unitarily connected at one end with a lip connecting portion 132 of the cable seal 102 that is unitarily connected with the main body of the cable seal 102. The lip connecting portion 132 is located at the major rear side 118 of the cable seal 102, but could also be located at the major front side 116 of the cable seal 102 or at an intermediate position between the front and rear sides 116, 118 of the cable seal 102.

Figure 17:
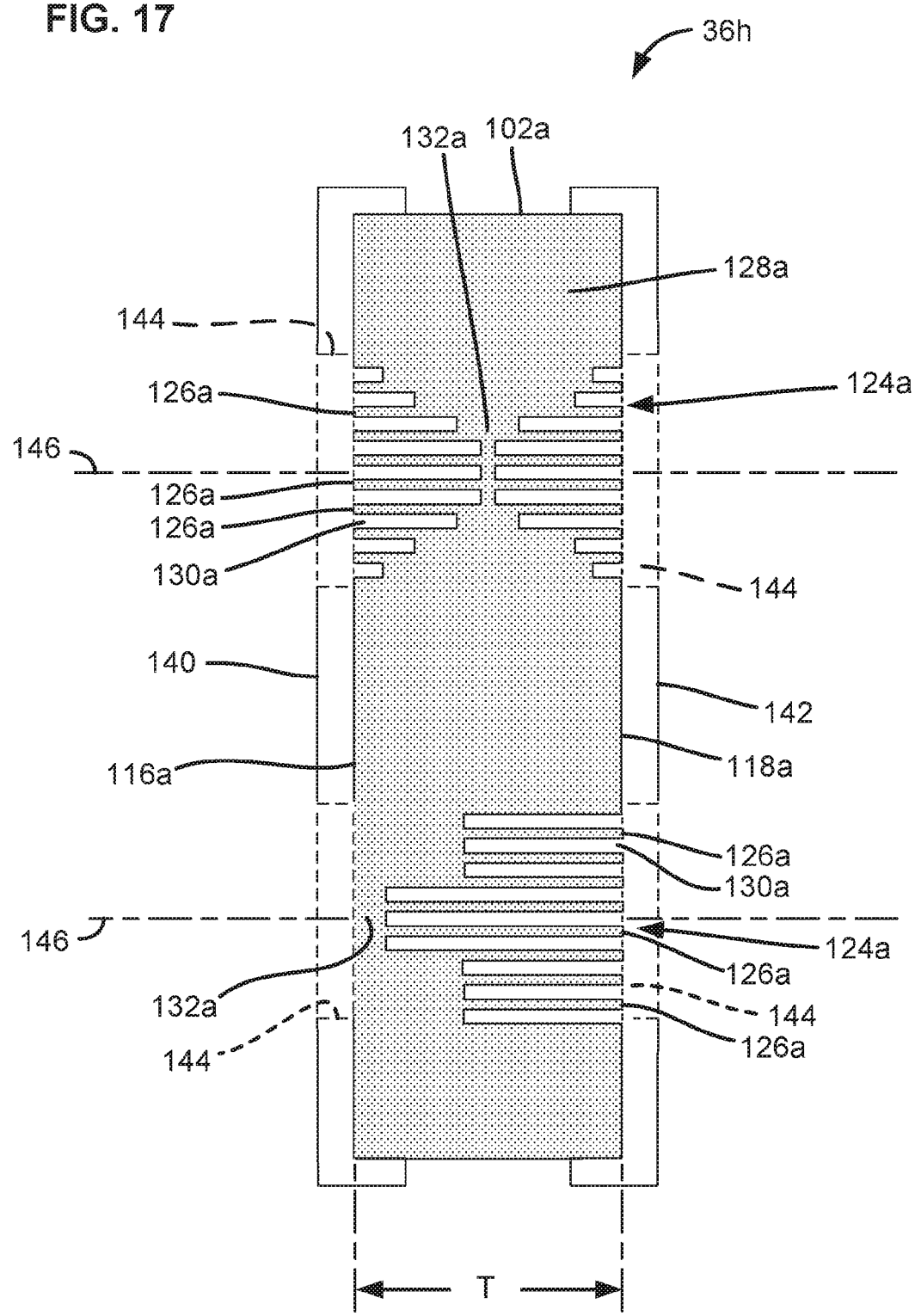
FIG. 17 is a cross-sectional view of a cable sealing device in accordance with the principles of the present disclosure having removable internal lips located at cable pass-through locations of the cable sealing device.

FIG. 17 depicts another cable sealing device 36h in accordance with the principles of the present disclosure. The cable sealing device 36h can optionally have the same perimeter shape as the cable sealing device 36g and can be configured to be mounted within the pocket of an enclosure such as one of the pockets 28 of the enclosure 20. The cable sealing device 36h includes a cable seal 102a defining two cable pass-through locations 124a. Front and rear sealant containment walls 140, 142 are respectively secured at major front and rear sides 116a, 118a of the cable seal 102a. The cable seal 102a defines a thickness T that extends between the front and rear sides 116a, 118a. The front and rear sealant containment walls 140, 142 define cable openings 144 that align with the cable pass-through locations 124a.

The cable seal 102a includes a plurality of removable lips 126a that can be removed from a remaining portion 128a of the cable seal 102a to reduce an overall volume of the cable seal 102a. Thus, the lips 126a can serve the same volume compensation function as the lips 126. The lips 126a are located at an interior of the cable seal 126a. For example, the lips 126a are positioned at the cable pass-through locations 124a. The lips 126a preferably curve about cable insertion axes 146 centered at the cable pass-through locations 124a. For example, the lips 126a can include annular strips that are concentric with respect to one another and are centered about the cable insertion axes 146. The lips 126a can be separated by annular slits 130a that are also concentric with respect to the cable insertion axes 146. In certain examples, the lips 126a can be configured to be pushed out of the remaining portion 128a of the cable seal 102a as the cable is inserted through a given one of the cable pass-through locations 124a along the axis 146. Alternatively, the lips 126a can be torn or cut away from the remaining portion 128a prior to inserting a cable through the given cable pass-through location 124a. It will be appreciated that the number of lips 126a removed is directly proportional to the size of the cable intended to be routed through the given cable pass-through location 124a.

Referring again to FIG. 17, the lips 126a corresponding to the upper cable pass-through location 124a connect to the remaining portion 128a via a lip interconnect portion 132a located at an intermediate position between the front and rear sides 126a, 118a of the cable seal 102a. In the depicted example, the lip connection portion 132a is generally centered between the front and rear sides 116a, 118a. In the depicted example, lips 126a are located on both sides (e.g., on front and rear sides) of the lip connection portion 132a. It will be appreciated that the lips 126a can have different lengths measured in an orientation across the thickness T of the cable seal 102a. In the depicted example corresponding to the upper cable pass-through location 124a, the lips 126a closer to the cable insertion access 146 are longer than the lips 126a positioned farther away from the cable insertion axis 146.

Referring still to FIG. 17, the lips 126a corresponding to the lower cable pass-through location 124a are connected to the remaining portion 128a of the cable seal 102a by a lip connection portion 132a located adjacent the front side 116a of the cable seal 102a. In other examples, the lip connection portion 132a could be adjacent the rear side 118 of the cable seal 102a. At least some of the lips 126a of the lower cable pass-through location 124a have different lengths measured along the thickness T of the cable seal 102a. For example, the innermost lip 126a is longer than the three outermost lips 126a. In the lip configuration corresponding to the upper cable pass-through location 124a, each of the concentric lips has a different length measured along the thickness T, with the lips 126a having progressively longer lengths as the lips are closer to the cable insertion axis 146. The upper cable pass-through location 124a includes four concentric lips.

Figure 18:
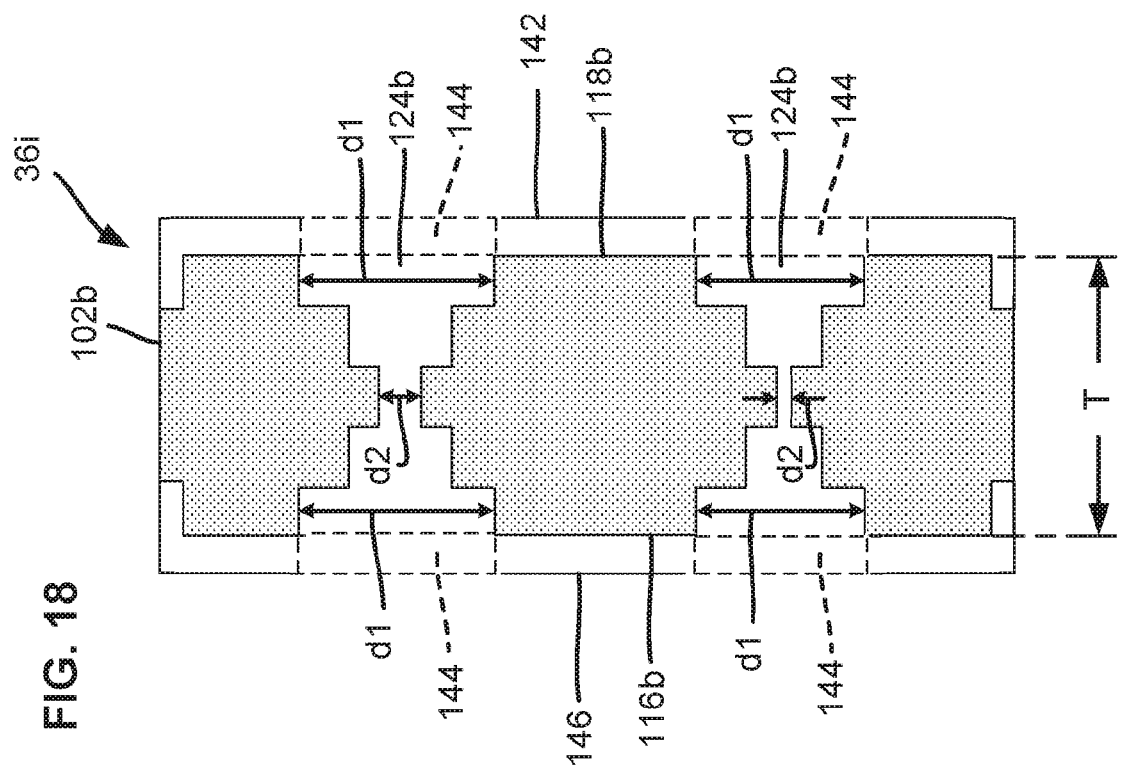
FIG. 18 is a cross-sectional view of a cable sealing device in accordance with the principles of the present disclosure having a variable diameter cable port with a stepped configuration.

FIG. 18 shows another cable sealing device 36i in accordance with the principles of the present disclosure. The cable sealing device 36i can optionally have the same profile as the cable sealing device 32g and can be adapted to be installed in a pocket of an enclosure such as the pocket 28 of the enclosure 20. The cable sealing device 36i includes a cable seal 102b defining at least one cable pass-through location 124b. In the depicted example, the cable seal 102b defines two cable pass-through locations 124b. The cable seal 102b includes a thickness T that extends between front and rear sides 116b, 118b of the cable seal 102b. The cable sealing device 36i includes front and rear sealant containment walls 140, 142 respectively secured at the front and rear sides 116b, 118b. The cable pass-through locations 124b are depicted as cable ports that extend through the thickness T of the cable seal 102b. The cable ports define major cross-dimensions d1 adjacent the front and rear sides 116b, 118b of the cable seal 102b, and minor cross-dimensions d2 at an intermediate location between the front and rear sides 116b, 118b. It will be appreciated that the upper and lower ports can be designed with different major and minor cross-dimensions such that each of the ports can be configured to accommodate a different range of cable sizes. In certain examples, the front and rear sealant containment walls 140, 142 define cable openings 144 that align with the cable ports. It is preferred for the cable openings 144 to have cross-dimensions that are equal to or larger than the major dimensions. In one preferred example, the major and minor dimensions are diameters of the ports.

Referring still to FIG. 18, the ports of the cable pass-through locations 124b have a stepped configuration that provides open space within the cable ports for sealant material to flow when cables are inserted through the cable pass-through locations 124b. The open space allows for volume compensation corresponding to different sized cables. In certain examples, the cable sealing device 36i is used in a system where no additional stored energy is required for maintaining pressurization of the cable seal 102b. Instead, the stored energy for maintaining pressurization of the cable seal 102b is provided by the material of the cable seal 102b which expands into the open space within the cable pass-through locations 124b and is pressurized. Due to relatively low compression-set characteristics of the material forming the cable seal 102b, the material wants to return to its original shape and therefore provides stored energy for maintaining pressurization of the cable seal 102b.

Figure 19:
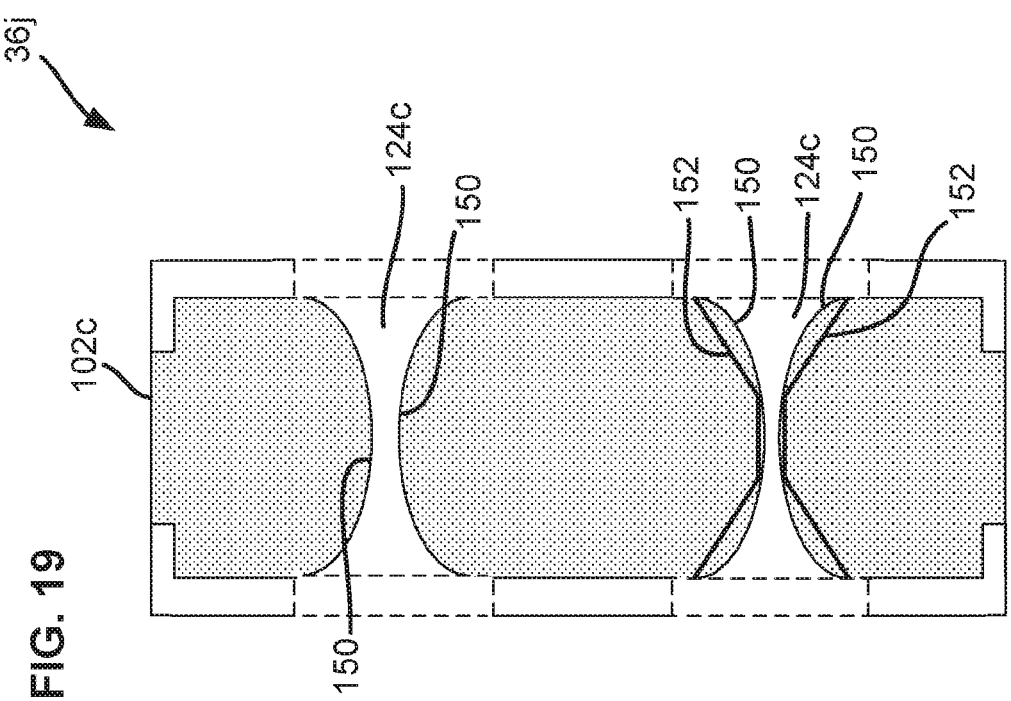
FIG. 19 is a cross-sectional view of a cable sealing device in accordance with the principles of the present disclosure having a variable diameter cable port with a curved diameter transition.

FIG. 19 depicts a cable sealing device 36j having the same configuration as the cable sealing device 36i except the cable sealing device 36j has a cable seal 102c with cable pass-through locations 124c defined by tapered ports instead of stepped ports. Similar to the cable sealing device 36i, the cable ports of the cable sealing device 36j have minor cross-dimensions adjacent a middle region of the cable seal 102c and major cross-dimensions adjacent front and rear sides of the cable seal 102c. As indicated above, the ports have a tapered configuration that converged toward a central region of the cable seal 102c. The tapered configuration can be curved as shown by lines 150, or linear as shown by lines 152.

Figure 21:
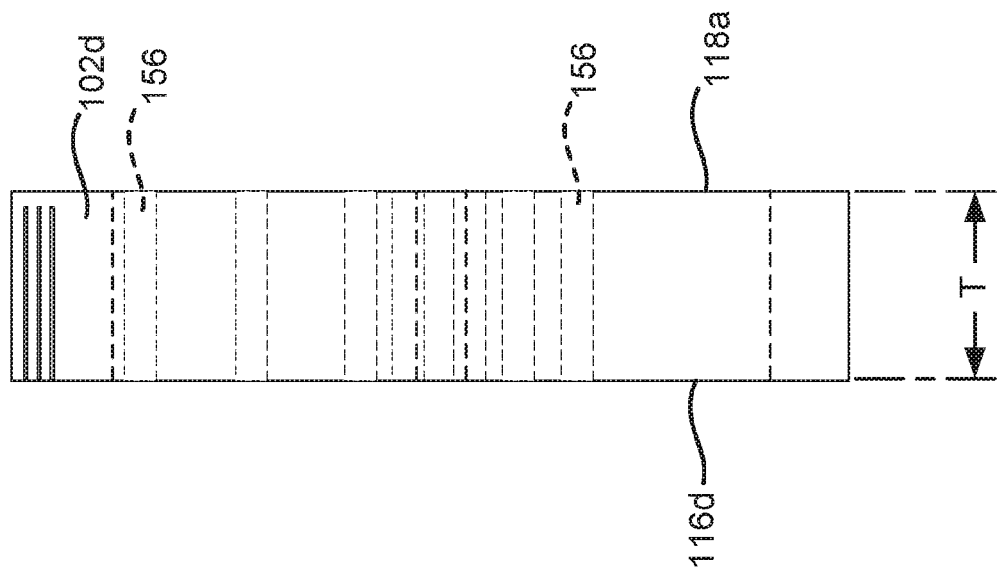
FIG. 21 is a side view of the cable sealing device of FIG. 20.
Figure 20:
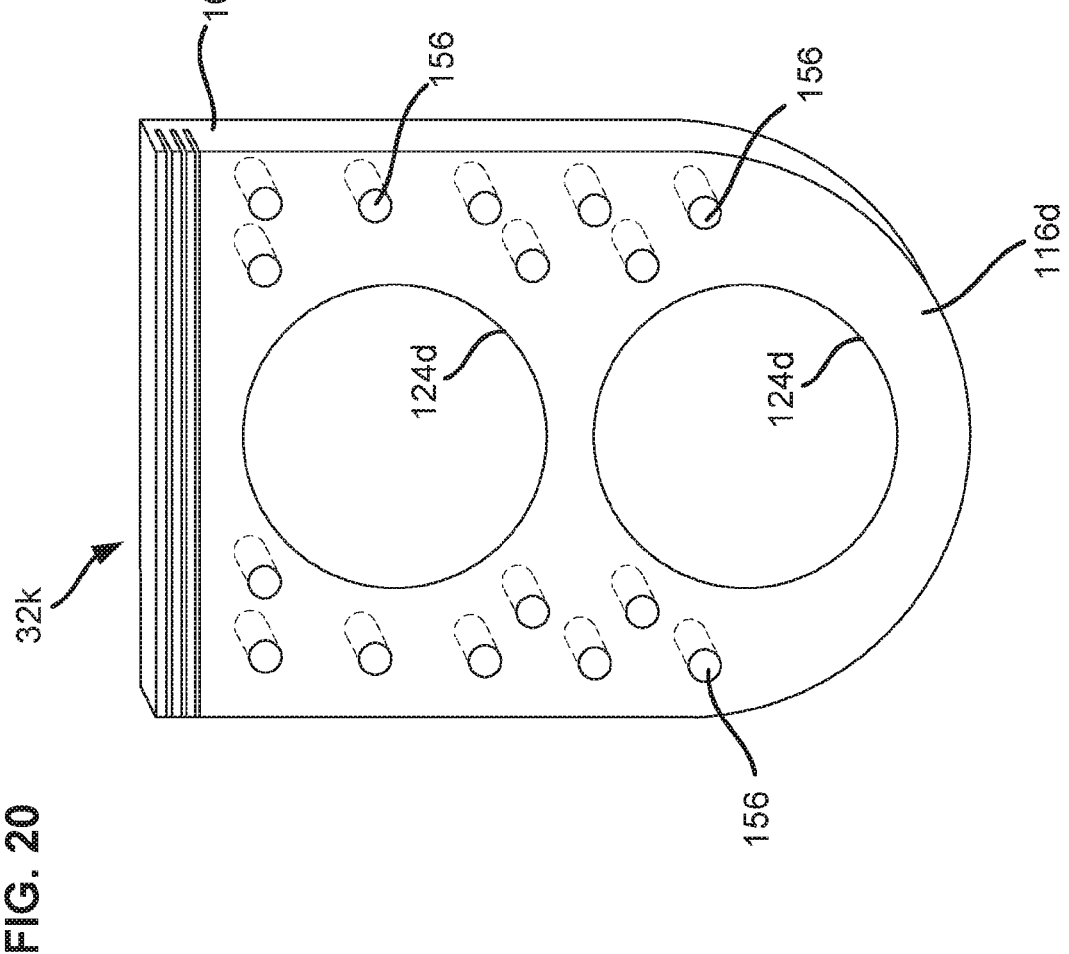
FIG. 20 is a front view of a cable sealing device in accordance with the principles of the present disclosure having volume compensating openings defined therein.

FIGS. 20 and 21 depict another cable sealing device 32k in accordance with the principles of the present disclosure. The cable sealing device 32k optionally can have the same outer profile or perimeter shape as the cable sealing device 36g. The cable sealing device 32k can be configured to be mounted in a pocket of an enclosure such as the pocket 28 of the enclosure 20. The cable sealing device 36k includes volume compensation features for allowing the cable sealing device 36k to accommodate a wide range of cable sizes. The cable sealing device 36k includes a cable seal 102d defining at least one cable pass-through location 124d for passing a cable through a thickness T of the cable seal 102d. The cable seal 102d can be constructed of a material that may include gel of the type described herein. The thickness T extends between front and rear sides 116d, 118d of the cable seal 102d. The cable seal 102d defines a plurality of volume compensating holes 156 that extend at least partially through the thickness T of the cable seal 102d. The volume compensating holes 156 are not configure for receiving cables. In certain examples, the volume compensating holes 156 can extend only partially through the thickness T of the cable seal 102d, or can stand extend fully through the thickness T of the cable seal 102d. In certain examples, the volume compensating holes 156 can contain a gas such as air, or can be filled with a filler that preferably has resilient characteristics. An example filler having example resilient characteristics can include foam. The number and size of the volume compensating holes 156 are selected to provide sufficient space to accommodate the portion of the cable seal 102d displaced by the largest cable anticipated to be accommodated by the cable seal 102d. In certain examples, the material forming the cable seal 102d can have relatively low compression set characteristics such that the cable seal, when deformed, wants to return to its original shape. Thus, when a cable is pass through one of the cable pass-through locations 124d, sealant of the cable seal is displaced and flows into the volume compensating holes 156 thereby closing the volume compensating holes 156. The deformed sealant material has stored energy that maintains pressurization of the cable seal. Therefore, in a preferred example, no additional stored energy system (e.g., coil springs, leaf springs or the like) are required. In other examples, the cable seal 102d can include a plurality of discrete closed gas cells are enclosed with the interior of the cable seal 102d and are dispersed throughout the cable seal 102d. In certain examples, closed gas cells can be formed by bubbles such as air bubbles. An example gas within the closed cells can include air. The closed cells provide open space for receiving a displaced volume of the cable seal which is displaced by a cable routed through the cable seal 102d. In the depicted example, the cable seal 102d includes two cable pass-through locations 124d.

Figure 23:
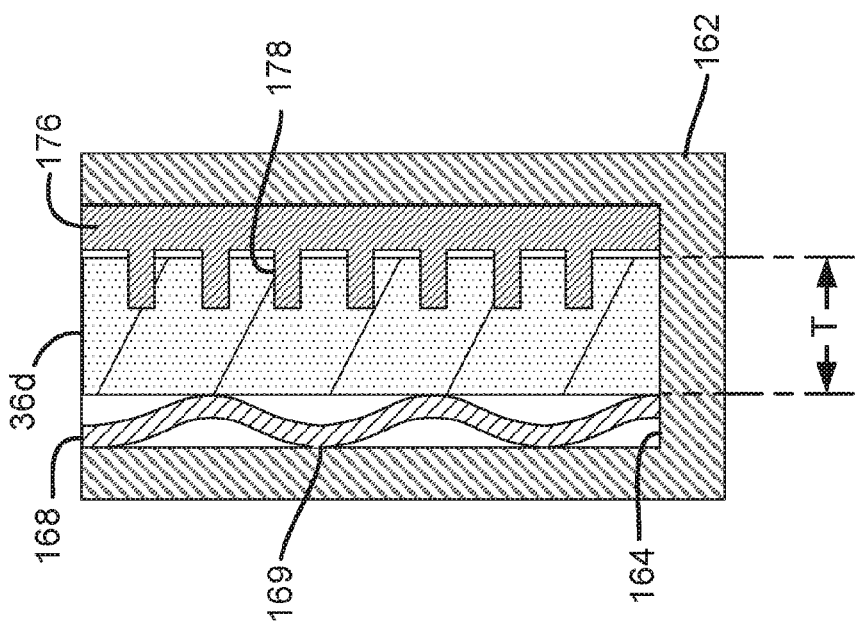
FIG. 23 is a cross-sectional view taken along section line 23-23 of FIG. 22.
Figure 22:
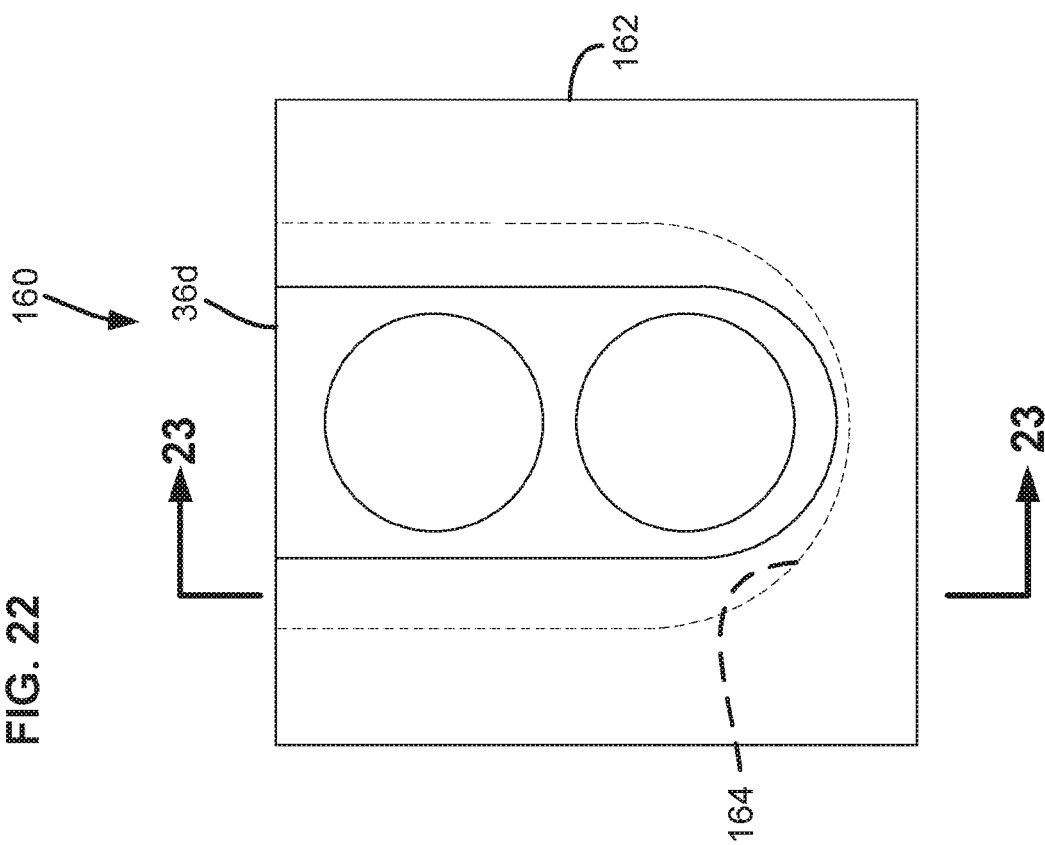
FIG. 22 is a front view showing a cable sealing device in accordance with the principles of the present disclosure mounted within a pocket of an enclosure.

It will be appreciated that cable sealing devices in accordance with the principles of the present disclosure can be used with sealing systems and sealing enclosures that do not include separate stored energy systems. In these types of systems, stored energy is provided integrally within the material of the cable seals themselves. In other examples, cable sealing devices in accordance with the principles of the present disclosure can be used in combination with sealing enclosures and sealing systems that include separate stored energy systems. For example, FIGS. 22 and 23 show an example sealing system 160 including an enclosure 162 defining a pocket 164 that receives a cable sealing device 36l in accordance with the principles of the present disclosure. It will be appreciated that the cable sealing device 36l can optionally have the same outer perimeter shape as the cable sealing device 36g. The sealing system 160 can include structures for applying pressure and storing compressive energy for pressurizing the cable sealing device 36l. The sealing system 160 can also include volume compensating structures. For example, the sealing system 160 can include a wedge structure that is forced into the pocket 164 after installation of the cable sealing device 36l to provide pressurization of the cable sealing device 36l. The wedge can be used in combination with a spring such as a coil spring or leaf spring or a spring biased piston structure within the pocket 164 that is capable of providing stored mechanical energy for maintaining pressure on the cable sealing device 36l. In other examples, the spring structure can be integrated into the wedge structure.

As shown at FIG. 23, a wedge clip 168 is used to pressurize the cable sealing device 36l and to include stored mechanical energy for maintaining pressure on the cable sealing device 36l over time. The wedge clip 168 is depicted including an integrated leaf-spring structure 169 depicted by bends within the clip 168. When the wedge clip 168 is forced into the pocket 164, the wedge clip 168 is flattened thereby applying axial spring load to the cable sealing device 36l. The wedge clip 168 includes two spaced-apart legs 170 that are separated by a gap 172. The wedge clip also includes a bridge portion 174 that traverses the gap 172 and connect the legs 170. The leaf-spring configuration 169 is integrated with the legs 170. Thus, the legs 170 function as leaf springs which are compressed when the wedge clip 168 is forced into the pocket 164 against the cable sealing device 36l.

The sealing system 160 can also include one or more structures for providing volume compensation to allow for the cable sealing device 36l to be compatible with a wide range of cable sizes. In certain examples, the volume compensating structures can include open regions into which the cable sealing material of the cable sealing divide 36l can flow when the cable sealing device 36l is pressurized. At least a portion of the volume of the cable sealing device 76l that flows into the open space provided by the volume compensation arrangement can relate to the amount of cable sealant displaced by the one or more cables routed through the cable sealing device 36l. In certain examples, the volume accommodating structure can include open space defined between or around projections that engage the cable sealant of the cable sealing device 36l. In certain examples, projections can include a bed of projections such as a bed of pins or a bed of ribs.

In the depicted example, the volume compensating structure includes a volume compensating clip 176 having a bed of projections 178 such as a bed of pins. The bed of projections 178 engage the material of the cable sealing device 76l. When the cable sealing device 76l is pressurized, material of the cable sealing device 36l flows to the open region between the projections of the bed of projections 178. In this way, the void space between the projections 178 provides space for sealant volume compensation. Additionally, material extruded into the space between the projections 178 can provide stored energy for maintaining pressurization of the cable sealing device 36l.

Figure 25:
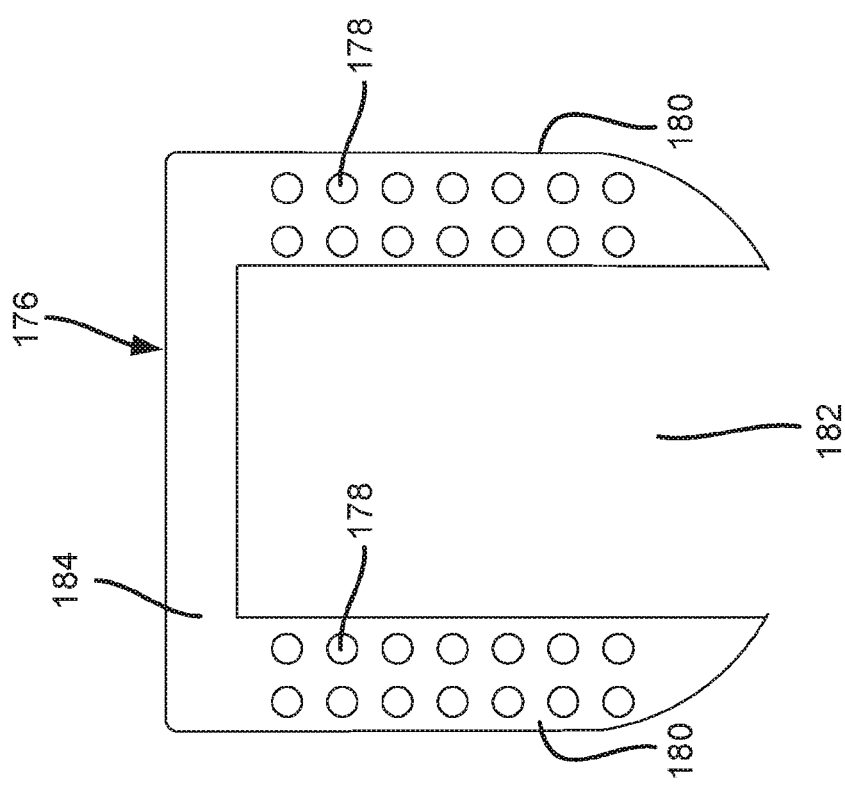
FIG. 25 is a front view of a volume compensation clip used to provide volume compensation with respect to the cable sealing device of FIGS. 22 and 23.
Figure 24:
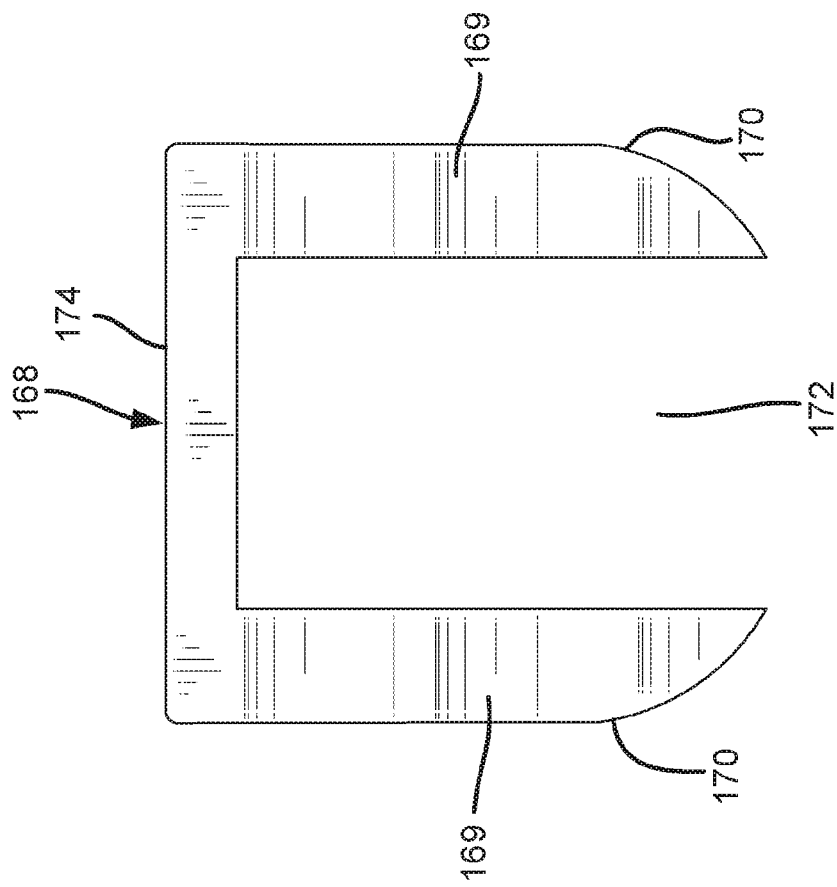
FIG. 24 is a front view of a wedge clip used to pressurize the cable sealing device of FIGS. 22 and 23.

As shown at FIG. 25, the volume compensating clip 176 includes legs 180 separated by a gap 182. The legs 180 are connected by a bridge 184 that traverses the legs 180. The bed of projections 178 is provided on the legs 180. In practice, the cable sealing device 76l and the volume compensating clip 176 can initially be loaded into the pocket 164. One or more cables can be pre-installed within the cable sealing device 36l prior to installation. Once the cable sealing device of 36l and the volume compensating clip 176 have been loaded into the pocket 164, the wedge clip 168 can be forced into the pocket 164 thereby causing deflection of the spring portion of the wedge clip 168 and pressurization of the cable sealing device 36l.

Figure 26:
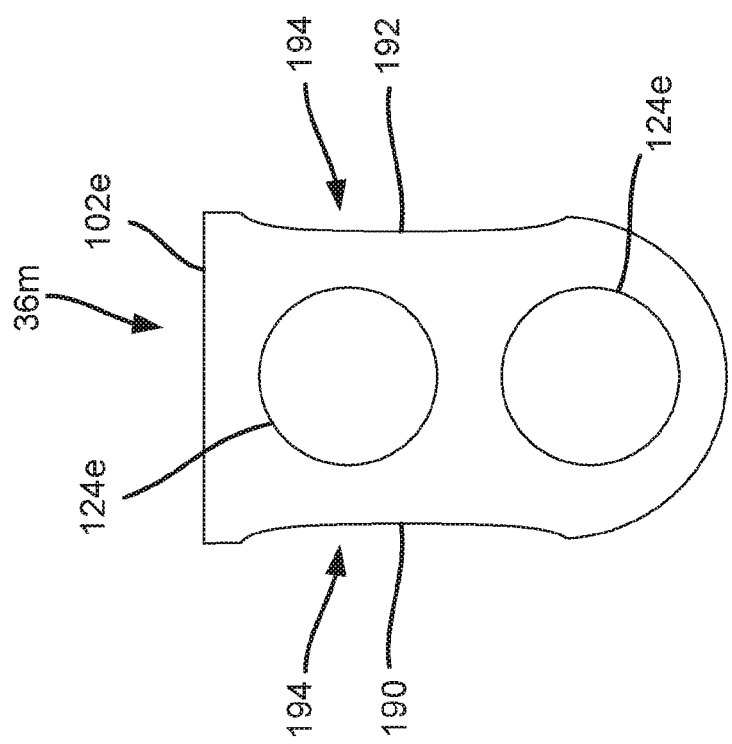
FIG. 26 is a front view of a cable sealing device in accordance with the principles of the present disclosure having recessed sides.

FIG. 26 shows another cable sealing device 36m in accordance with the principles of the present disclosure. It will be appreciated that the cable sealing device 36m is adapted for use with a sealing system including an enclosure having pockets such as pockets 28 for receiving the cable sealing device 36m. The cable sealing device 36m optionally can have a configuration similar to the cable sealing device 36g, except the cable sealing device 36m includes a cable seal 102e having opposite sides 190, 192 which include recesses 194. In certain examples, recesses 194 can be defined by concave surfaces at the sides of the cable seal 102e. When the cable seal 102e is inserted into a pocket, the recessed sides provide reduced contact area between the sides of the cable seal 102e and the sides of the pocket thereby reducing friction and reducing the force required to insert the cable seal 102e into the pocket. Additionally, the recesses can be sized to provide volume compensation and can be coordinated with the intended size of cables desired to be routed through cable pass-through locations 124e that extend through a thickness of the cable seal 102e. For example, the recesses can be configured to define an open space having a volume coordinated with a volume of sealant material displaced by a cable of a given size when the cable is inserted through one of the cable pass-through locations 124e.

Figure 27:
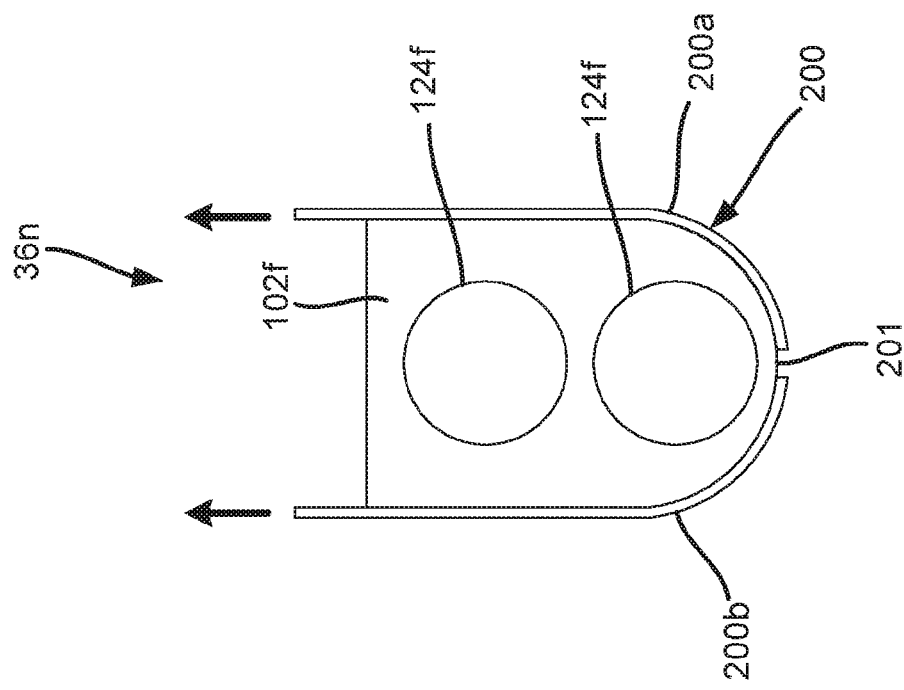
FIG. 27 is a front view of a cable sealing device in accordance with the principles of the present disclosure having a removable liner.

FIG. 27 shows another cable sealing device 36n in accordance with the principles of the present disclosure. Once again, the cable sealing device 36n can optionally have a configuration and perimeter shape the same as the cable sealing device 36g. The cable sealing device 36n is adapted to be loaded into pockets of an enclosure such as the pockets 28 of the enclosure 20. The cable sealing device 26n includes a cable seal 102f defining a cable pass-through location 124f (e.g., two cable pass-through locations 124f are shown) for passing cables through a thickness of the cable seal 36n. The cable sealing device 36n includes a removable liner 200 affixed to at least a portion of a perimeter of the cable seal 102f. In certain examples, the liner 200 extends along opposite sides and around an end 201 of the cable seal 102f In certain examples, the liner 200 can include one or more pieces that can be separate from one another or can be coupled together at a predetermined break location. Example materials for the liners can include foils and films. In use of the cable sealing device 36n, the cable sealing device 36n is inserted into a pocket of an enclosure and the liner 200 provides reduced friction for facilitating inserting the cable seal 102f into the pocket. Once the cable sealing device 36n is inserted within the pocket, the liner 200 can be removed. The liner can be removed in one, two or more pieces. In a preferred example, the liner is removed in two pieces 200a, 200b with each piece corresponding to an opposite side of the cable seal 102f The two pieces can be separate pieces, or can be connected by a predetermined care location located at a mid region of one end of cable seal 102f.

Figure 29:
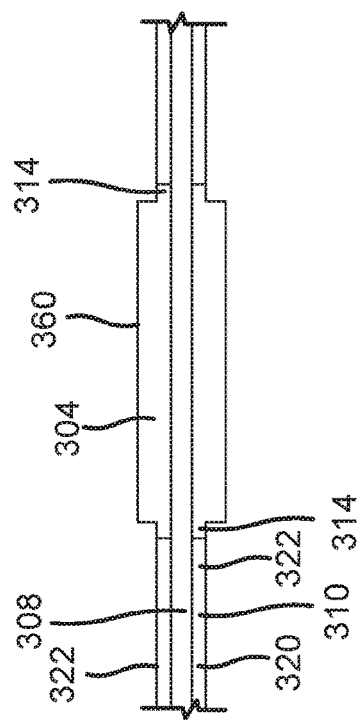
FIG. 29 is a top view of the cable sealing device of FIG. 28.
Figure 28:
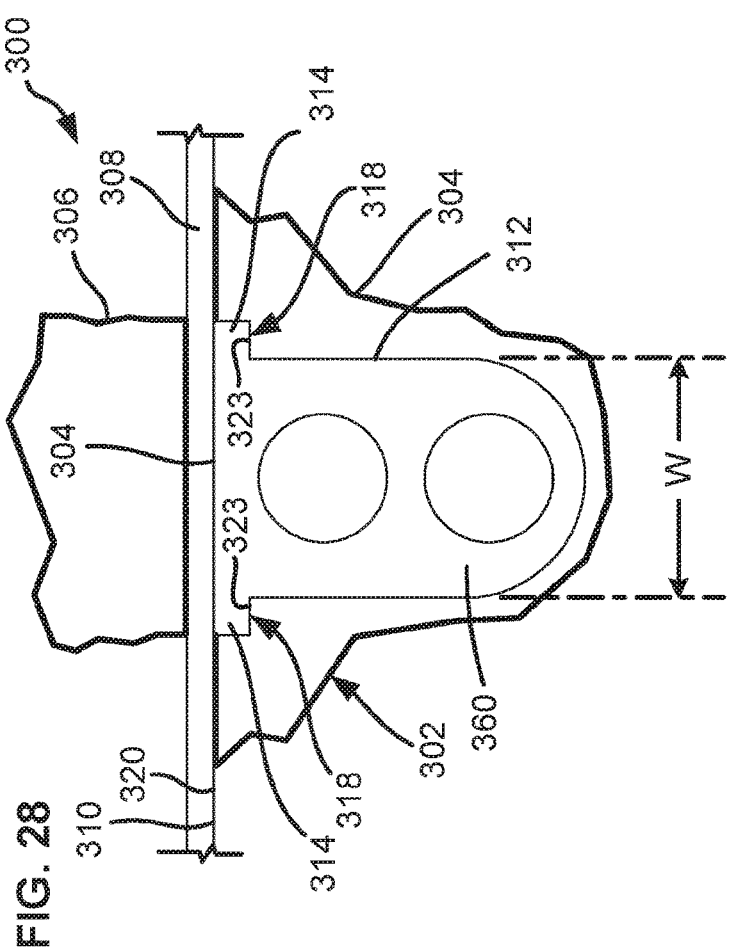
FIG. 28 is a front view showing a cable sealing device in accordance with the principles of the present disclosure mounted within a pocket of an enclosure, the cable sealing device has cable sealing protrusions received within notches defined at the pocket of the enclosure.

FIGS. 28 and 29 depict a cable sealing system 300 including an enclosure 302 formed by a first housing piece 304 that mates with a second housing piece 306 at a sealed perimeter interface. The sealed perimeter interface can be sealed by a gasket 308 that extends about a perimeter defined between the first and second housing pieces 304, 306. In one example, the gasket 308 can be mounted within a groove 310 defined by the first housing piece 304. The first housing piece 304 can also define a pocket at 312 for receiving a sealing device 36o in accordance with the principles of the present disclosure. The sealing device 36o can optionally have the same general shape and configuration as the sealing device 36g, except the sealing device 36o includes sealing projections 314 located at an end of the cable sealing device 36o for assisting in sealing a triple point region where the cable sealing device 36o, the first housing piece 304 and the gasket 308, together. The sealing projections 314 project outwardly from a main body 315 of a cable seal 316 of the cable sealing device 36o in an orientation that extends along a width W of the cable seal 316. The sealing projections 314 fit within notches 318 defined by the first housing piece 304. The sealing gasket 308 extends across a top end 309 of the cable sealing device 36o and across the sealing protrusions 314. The groove 310 of the first housing piece 304 includes a base surface 320 and side surfaces 322. The sealing gasket 308 is positioned in the groove 310 and is supported on the base surface 320 between the side surfaces 322. The notches 318 align with the groove 310 and include protrusion support surfaces 323 that are recessed relative to the base surface 320. Steps are defined between the base surfaces 320 and each of the protrusion support surfaces 323.

Figure 39:
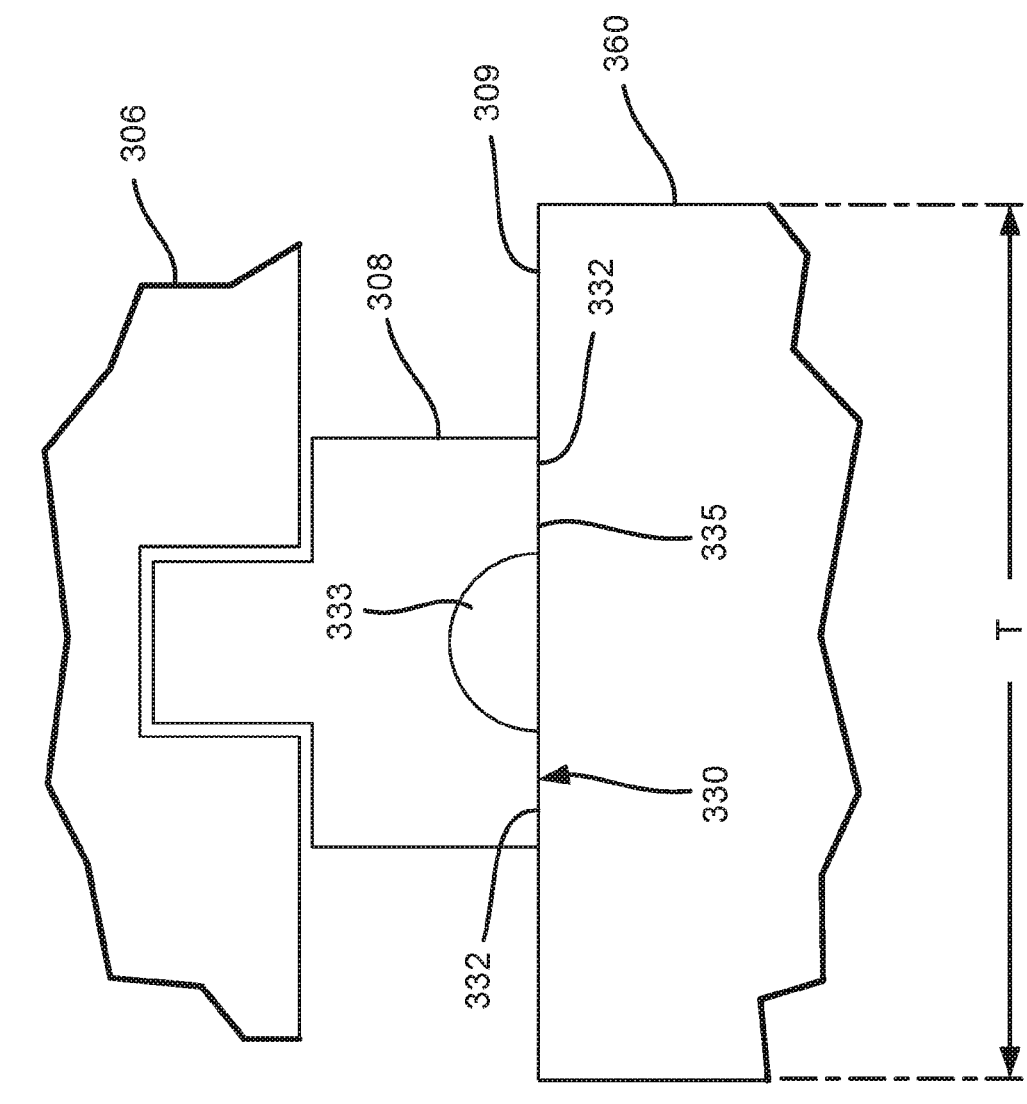
FIG. 39 is a cross-sectional view taken along section line 39-39 of FIG. 28.

As shown at FIG. 39, the sealing gasket 308 can include an undulating surface 330 which engages the end of the cable seal. The undulating surface undulates in an orientation across the thickness T of the cable seal 36o. The undulating surface includes at least two separate contact locations 332 for contacting the top end 309 of the cable seal 36o. The contact locations 332 are separated from one another in an orientation that extends across the thickness T of the cable seal 36o. The contact locations 332 are separated by a seal recess 333 which provides a breach in a leak path line 335 which extends across the thickness T of the cable seal 36o. The breach can also provide space for providing volume compensation with respect to the cable seal 36o. For example, a portion of the material forming the cable seal can flow into the recess 333 when the cable seal 36o is pressurized.

Figure 31:
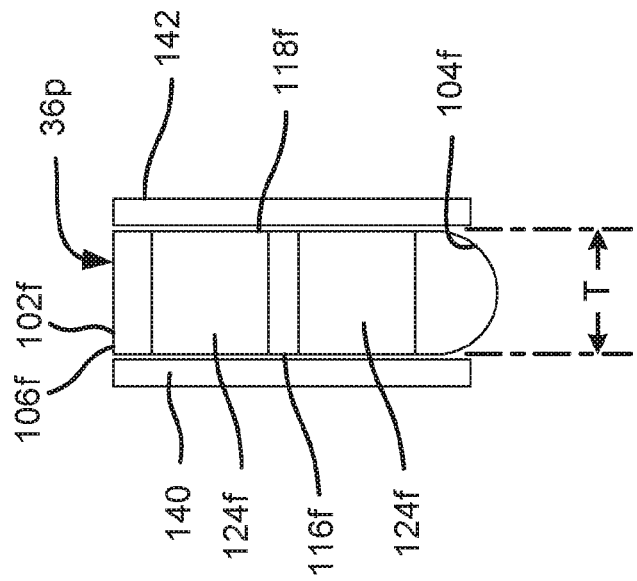
FIG. 31 depicts the cable sealing device of FIG. 30 used in combination with sealant containment walls having lower ends with interior chamfers.
Figure 30:
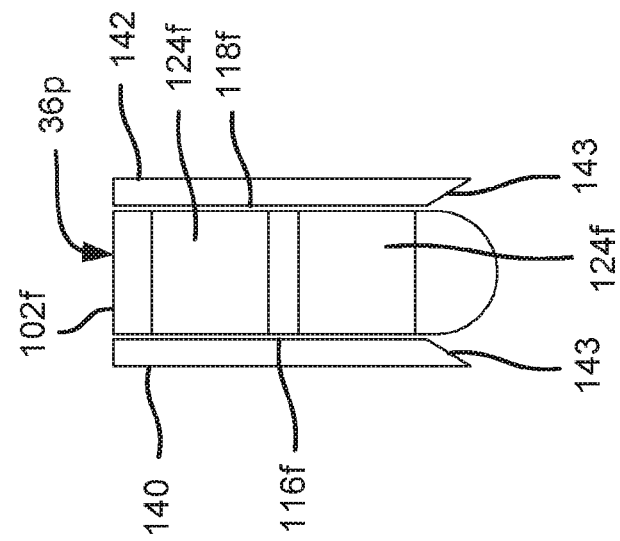
FIG. 30 depicts a cable sealing device in accordance with the principles of the present disclosure having a lower end that is rounded across its thickness.
Figure 32:
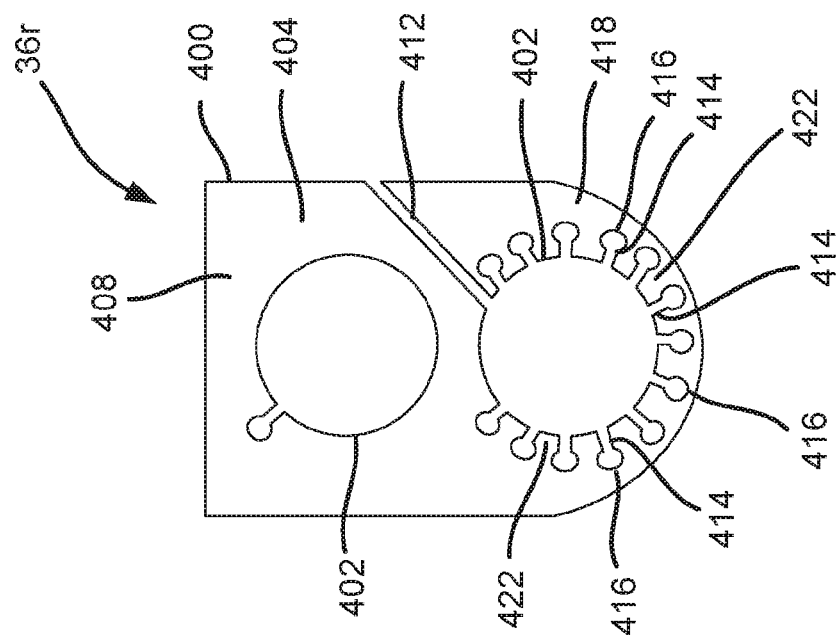
FIG. 32 is a front view showing a cable sealing device in accordance with the principles of the present disclosure having a lower cable pass-through location with a first wrap-around configuration.

FIGS. 30 and 32 depict another cable sealing device 36p in accordance with the principles of the present disclosure. The cable sealing device 36p can optionally have a length, a width and a thickness similar to the cable sealing device 36g. Additionally, the cable sealing device 36p can be configured to be installed within a pocket of an enclosure such as the pocket 28 of the enclosure 20. The cable sealing device 36p includes a cable seal 102f including cable pass-through locations 124f that extend through a thickness T of the cable seal 102f. The cable seal 102f also includes a major front side 116f and a major rear side 116f. Front and rear sealant containment walls 140, 142 are mounted at the major front and rear sides 116f, 118f. The cable seal 102f includes opposite first and second ends 104f, 106f. The first end 104f is depicted as a lower end and is the leading end when the cable seal 102f inserted into a pocket. The first end 104f is rounded in an orientation that extends across the thickness T of the cable seal 102f and is preferably also rounded in an orientation that extends across a width of the cable seal 102f. In the example of FIG. 31, the front and rear sealant containment walls 140, 142 have ends adjacent the first end 104f of the cable seal 102f that include interior chamfers 143 that provide open space for sealant volume compensation. The chamfers also prevent material from the cable seal 102f from extruding beneath the containment walls 140, 142 during the insertion process and interfering with the ability to fully insert the cable seal 36p into its corresponding pocket.

Figure 33:
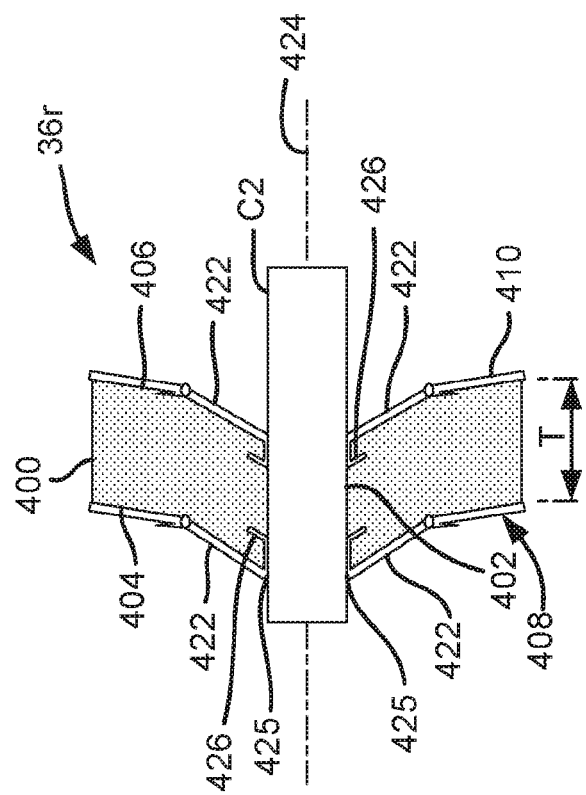
FIG. 33 shows the cable pass-through location of FIG. 32 accommodating a smaller cable.
Figure 34:
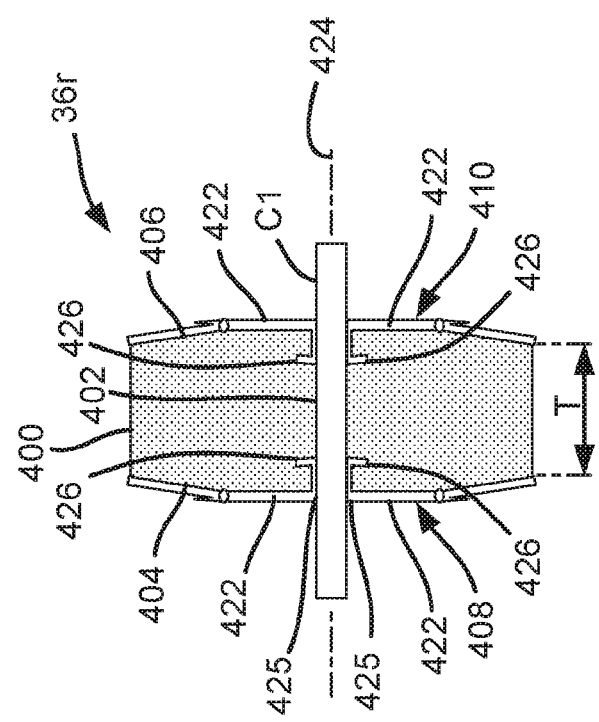
FIG. 34 shows the cable pass-through location of FIG. 32 accommodating a larger cable.

FIGS. 32-34 depict another cable sealing device 36r in accordance with the principles of the present disclosure. Once again, the cable sealing device 36r can optionally have a width, length and thickness similar to the cable sealing device 36g. Also, the cable sealing device 36r can be configured to be inserted within a pocket of an enclosure such as the pocket 28 of the enclosure 20. The cable sealing device 36r includes a cable seal 400 defining a cable pass-through location 402 for passing a cable through a thickness T of the cable seal 400. The thickness T can extend between front and rear sides 404, 406 of the cable seal 400. The cable sealing device 36r also includes front and rear sealant containment walls 408, 410 respectively secured at the front and rear sides 404, 406 of the cable seal 400. The cable seal 400 and the front and rear containment walls 408, 410 are constructed and arranged to provide a wrap-around configuration for allowing a cable to be inserted laterally into the cable pass-through location 402. The cable seal 400 is shown including upper and lower cable pass-through locations 402, with the lower cable pass-through location 402 being configured to provide a wrap-around configuration. The upper cable pass-through location 402 allows for axial insertion of cables therethrough.

The front and rear sealant containment walls 408, 410 and the cable seal 400 define an access slit 412 that extends through the thickness T of the cable seal 400 from the lower cable pass-through location 402 to a perimeter of the cable seal 400. The front and rear sealant containment walls 408, 410 and the cable seal 400 also define a plurality of hinge slits 414 that extend from the lower cable pass-through location 402 to hinge locations 416 positioned inside the perimeter of the cable seal 400. The access slit 412 and the hinge slits 415 allow a flap portion 418 of the cable seal 400 to be moved relative to a main body 420 of the cable seal 400 between a closed position and an open position. A cable can be laterally inserted into the cable pass-through location 402 when the flap portion 418 is in the open position. With the cable positioned at the cable pass-through location 402, the flap portion 418 can be wrapped around the cable to enclose the cable in the lower pass-through location 402 by moving the flap portion 418 from the open position to the closed position. The front and rear containment walls 408, 410 include sealant containment fingers 422 that can flex radially outwardly with respect to a central axis 424 of the lower cable pass-through location 402 to accommodate larger cables. The hinge slits 414 are positioned between the sealant containment fingers 422. The sealant containment fingers 422 include hooked ends 426 that embed in the cable seal 400. It will be appreciated that the sealant containment fingers 422 can be flexed relative to the central axis 424 between a neutral position and an expanded position. When in the neutral position, inner ends 425 of the sealant containment fingers 422 cooperate to define a first cable opening that surrounds the axis 424 and correspond in size to the size of a first cable C1. In contrast, when the sealant containment fingers 422 are flexed to the expanded position as shown at FIG. 34, the inner ends 425 of the sealant containment fingers 422 define an enlarged cable opening about the axis 424 having diameter adapted to correspond with a cable C2. It will be appreciated that the cable C1 has a diameter that is smaller than a corresponding diameter of the cable C.

Figure 35:
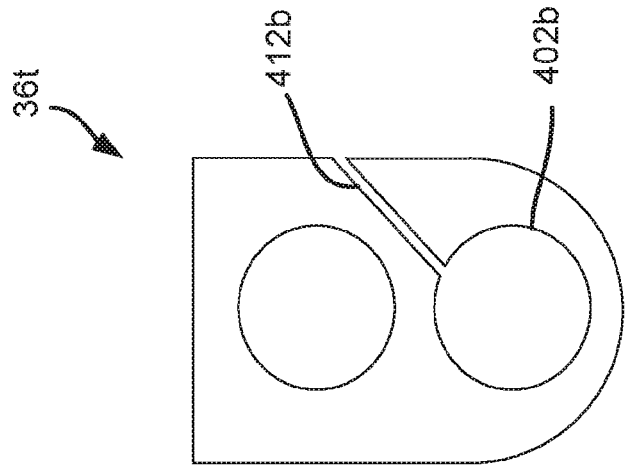
FIG. 35 is a front view of a cable sealing device in accordance with the principles of the present disclosure having a lower cable pass-through location with a second wrap-around configuration.

FIG. 35 shows a further cable sealing device 36s having a lower port with a second wrap-around configuration. The wrap-around configuration includes one access slit 412a and one hinged slit 414a. Both of the slits 412a and 414a interface with a lower cable pass-through location 402a at the same side (e.g., an upper side) of the cable pass-through location 402a. The hinged slit 414a defines a hinge location 416a positioned above the cable pass-through location 402a.

Figure 36:
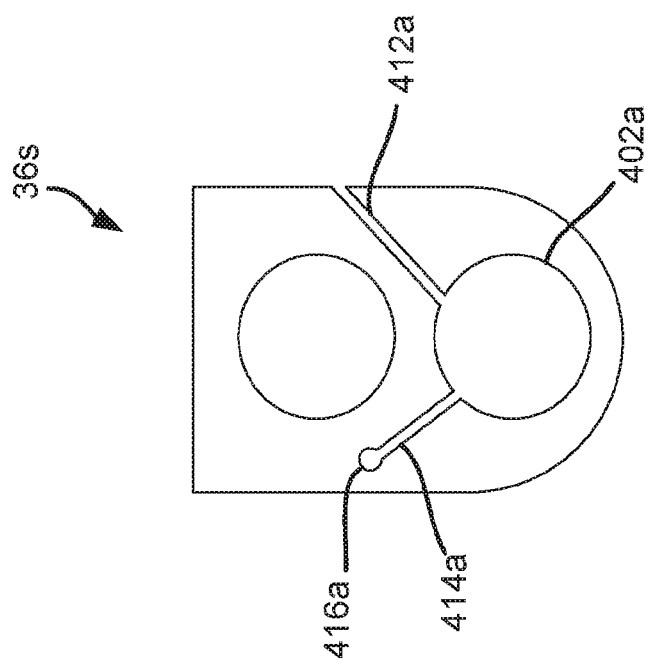
FIG. 36 is a front view of a cable sealing device in accordance with the principles of the present disclosure having a lower cable pass-through location with a third wrap-around configuration.

FIG. 36 shows a further cable sealing device 36t having a lower cable pass-through location 402b including a third wrap-around configuration. The wrap-around configuration of the cable sealing device 36t includes an access slit 412b and no hinge slits.

Figure 37:
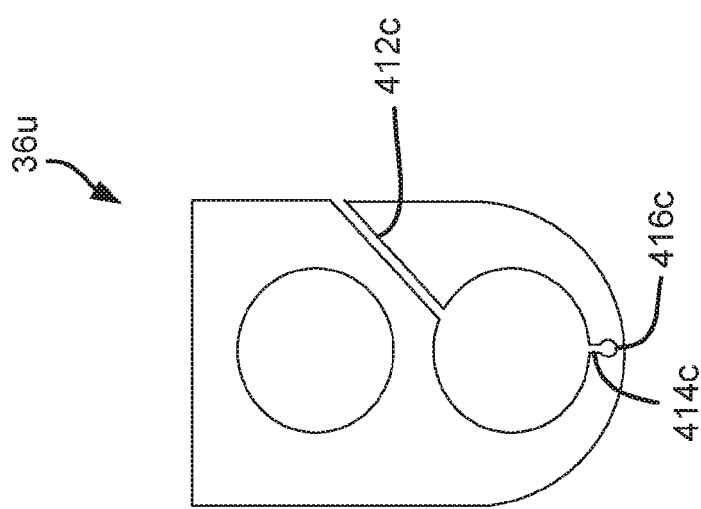
FIG. 37 is a front view of a cable sealing device in accordance with the principles of the present disclosure having a lower cable pass-through location with a fourth wrap-around configuration.

FIG. 37 depicts a further cable sealing device 36u in accordance with the principles of the present disclosure. The cable sealing device 36u includes a cable pass-through location 402c having a fourth wrap around configuration. The cable wrap-around configuration includes an access slit 412c and a relatively short hinge slit 414b connected to a hinge location 416b. The access slit 412b and the hinge slit 414b interface with the cable pass-through location 402b at opposite sides of the cable pass-through location 402c.

Figure 38:
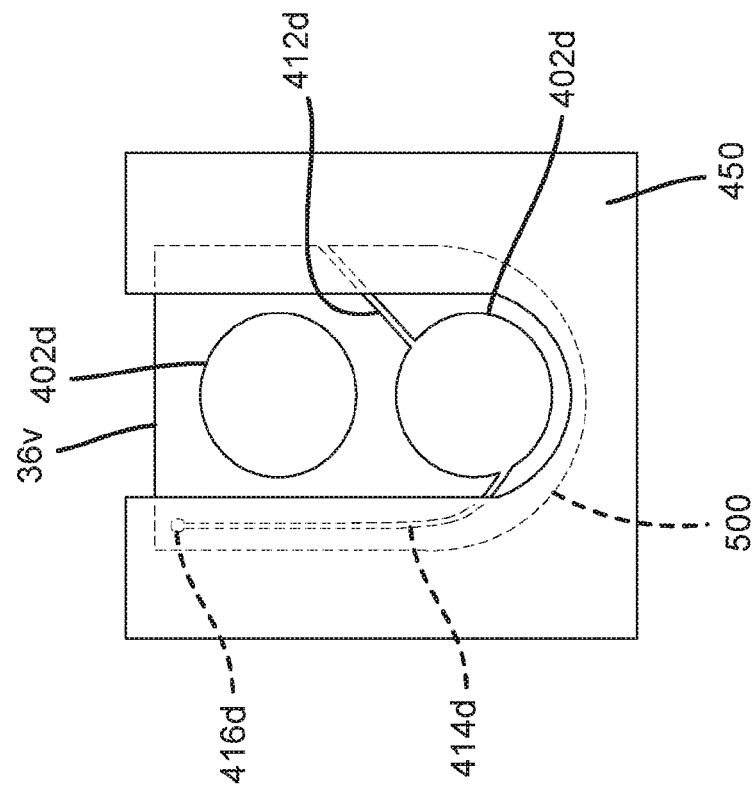
FIG. 38 is a front view of a cable sealing device in accordance with the principles of the present disclosure shown mounted within a pocket of an enclosure, the cable sealing device has a lower cable pass-through location with a fifth wrap-around configuration.

FIG. 38 depicts still another cable sealing device 36v in accordance with the principles of the present disclosure. The cable sealing device 36v includes a lower cable pass-through location 402d including a fifth wrap-around configuration. The wrap-around configuration includes an access slit 412d and an elongate hinge slit 414d. The hinge slit 414d extends from the cable pass-through location 402d to a hinge location 416d located higher than the upper cable pas-through location 402d. In the depicted example, the cable sealing device 36v is mounted within a pocket 500 of an enclosure 450. When the cable sealing device 36v is mounted within the pocket 500, a majority of the length of the hinge slit 414d is covered by a pocket defining portion of the housing 450.

Example Sealant Materials and Material Properties

In embodiments, the cable sealing insert is made of a material having a Shore 000 hardness in the range of 20-80 or 30-60. In embodiments, the cable sealing insert is made of a material having a compression set less than or equal to 10 percent, less than or equal to 15 percent, or less than or equal to 20 percent. In embodiments, the cable sealing insert is made of a material having a Shore 000 hardness in the range of 20-80 or 30-60 and a compression set less than or equal to 10 percent, less than or equal to 15 percent, or less than or equal of 20 percent. Any material that meets these Shore 000 hardness and compression set requirements can be used. In embodiments, the material is a composition that includes a dry silicone gel. In embodiments, the material is a composition that includes a polyurethane gel.

As used herein, the term "dry silicone gel" may refer to a chemically crosslinked polymer having a Si—O backbone and comprising a relatively low amount, or no amount at all, of diluent fluids such as silicone oil or mineral oil. As opposed to carbon-based polymers, the crosslinked silicone polymers of dry silicone gels are based on a Si—O backbone. The characteristics of silicon and oxygen provide crosslinked polymers with their exceptional properties. For example, silicon forms stable tetrahedral structures, and silicon-oxygen bonds are relatively strong which results in dry silicone gels with high temperature resistance. In addition, crosslinked Si—O polymers have a relatively high chain flexibility as well as low rotational energy barrier.

The dry silicone gels may be made according to a number of different polymerization reactions. In certain embodiments, the polymerization reaction is a hydrosilylation reaction, also referred to as a hydrosilation reaction. In some embodiments, the hydrosilylation reaction makes use of a platinum catalyst, while other embodiments make use of radicals. In further embodiments, the dry silicone gel is made by a dehydrogenated coupling reaction. In other embodiments, the dry silicone gel is made by a condensation cure RTV reaction.

In certain embodiments, the dry silicone gel is made by reacting at least a crosslinker, a chain extender, and a base polymer (e.g., a vinyl-terminated polydimethylsiloxane). In certain embodiments, a catalyst is included to speed up the reaction. In additional embodiments, an inhibitor may be used to slow down the rate of reaction.

Reaction mechanisms by which the dry silicone gel can be made as well as suitable base polymers, crosslinkers, chain extenders, catalysts, inhibitors, additives, and methods of making the dry silicone gel are provided in U.S. Pat. No. 8,642,891. The entirety of U.S. Pat. No. 8,642,891 is incorporated by reference herein.

Polyurethane gels are typically formed from the reaction of a polyfunctional organic isocyanate with a polyfunctional isocyanate reactive material in the presence of a non-volatile inert liquid. The polyurethane component of the gel is typically cross-linked (thermoset) and the isocyanate reactive material contributes to flexibility. The loading of the non-volatile inert liquid in polyurethane gels is typically quite high. It is almost always higher than 10% by weight of the total gel composition, and is typically higher than 30% by weight of the total gel composition. Plasticizer loadings of greater than 50% of the total composition are well known. Plasticizers (typically inert, non-volatile liquids) that have been used in the past in preparing polyurethane gels include phthalate plasticizers (such as DIOP), vegetable oils, mineral oils, liquid resins such as polybutene resins, other kinds of ether and ester containing liquids, mixtures of these, and the like.

For example, polyurethane gel can be made by gelling a mixture comprising conventional curable polyurethane precursor materials in the presence of substantial quantities of a mineral or vegetable oil or a mixtures thereof (e.g., in an amount of 60 to 80%) or a suitable plasticizer, e.g., a trimellitate such as n-octyl-n-decyl trimellitate (e.g., in an amount of 30 to 70%).

In some embodiments, the cable sealing insert material (e.g., a dry silicone gel or a polyurethane gel) has a hardness in the range of 20 to 80 Shore 000. In some embodiments, the cable sealing insert material (e.g., a dry silicone gel or a polyurethane gel) has a hardness in the range of 30 to 60 Shore 000. In other embodiments, the cable sealing insert material (e.g., a dry silicone gel or a polyurethane gel) has a hardness in the range of 37 to 45 Shore 000. In yet other embodiments, the cable sealing insert material (e.g., a dry silicone gel or a polyurethane gel) has a hardness in the range of 38 to 42 Shore 000. Shore 000 hardness referenced herein is residual hardness measured according to ASTM D2240 with a 30 second hold time.

For further example, in some embodiments, the compression set of the cable sealing insert material (e.g., a dry silicone gel or a polyurethane gel) is less than or equal to 10%, less than or equal to 15%, or less than or equal to 20%, or is 4% to 10% when measured according to ASTM D395, method B at a temperature of 85° C. after 24 hours of recovery. In an embodiment, the compression time is 22 hours. In another embodiment, the compression time is 72 hours.

In some embodiments, the cable sealing insert material (e.g., a dry silicone gel or a polyurethane gel) is compressed to about 50% of its original height. This causes a certain stress in the material. The stress is now reduced because the material relaxes. In certain embodiments, the stress relaxation of the cable sealing insert material is 20% to 70% when subjected to compression to about 50% of the original height of the material at 85° C., wherein the stress relaxation is measured after a one minute hold time. In certain embodiments, the stress relaxation of the cable sealing insert material is 30 to 60% when subjected to compression to about 50% of the original height of the material at 85° C., wherein the stress relaxation is measured after a one minute hold time. In other embodiments, the stress relaxation of the cable sealing insert material is 40% to 60% when subjected to compression to about 50% of the original height of the material at 85° C., wherein the stress relaxation is measured after a one minute hold time. A higher stress relaxation indicates that once a cable sealing insert material is installed in an enclosure, the cable sealing insert material will require less stress in order for it to seal.

Sealant materials (i.e., gel materials) that may be used for cable seals (e.g., cable sealing inserts) in accordance with the present disclosure can have certain material properties adapted to facilitate cable size range taking and reliable sealing in systems that optionally may not include a separate actuator for pressurizing the sealant and for maintaining pressure on the sealant over extended times. For example, example sealant materials can be defined by properties such as hardness, compression set, resistance to extrusion, elongation to failure, and oil bleed out properties. Example value ranges for each property and testing procedures for measuring these values for sample materials are described below.

Indentation Hardness

The sealant material can be tested for indentation hardness using a texture analyzer including a load cell and a probe assembly. The load cell may be motor drive. The load cell may be bi-directional. The probe assembly includes a stainless-steel ball probe. The ball probe has a size of about 6.35 mm (0.25 in). The load cell has a minimum resolution of 0.20 g and ±0.5% FSR accuracy. The load cell has a trigger point of about 4 g. One example texture analyzer suitable for the hardness test is the Brookfield CT3 Model 1500 offered by Brookfield Engineering Laboratories, Inc. of Middleboro, Mass.

During the test, the material to be tested is placed in a cup beneath the probe assembly. The cup is formed from aluminum. The cup is filled with 51 g of the material to be tested. The material filling the cup is bubble free. The cup has a frusto-conical inner shape having a major inner diameter of 50 millimeters at an open top end, a minor inner diameter of 45 millimeters at a closed bottom end, and a depth of 30 millimeters extending between the top and bottom ends.

The load cell drives the probe assembly vertically into a sample of material at a speed of 2 mm/sec to a depth of 4 mm. The load cell holds the probe assembly at the 4 mm depth for 1 hour.

The indentation hardness is measured (in grams) as a peak force and a residual force applied by the load cell to the probe assembly. The peak hardness is measured instantly when the probe assembly is at the pre-set depth from the trigger point. The residual hardness is measured at the pre-set depth after passage of the pre-set period of time. For example, the residual hardness may be measured after 1 hour (3600 seconds). In certain examples, an average and standard deviation are calculated for the peak force and residual force measurements. In one example, sealing materials suitable for use in the gel sealing applications described herein have a residual indentation hardness ranging from 20 g to 80 g after 1 hour.

Compression Set

The sealant material can be tested for compression set under constant deflection in air. In certain examples, the material is tested using ASTM D395, Method B.

The material to be tested is formed into a cylindrical sample. The cylindrical sample has a diameter of about 20 mm and a height of about 20 mm.

The test is conducted using an oven (e.g., air circulating) and a compression fixture. The compression fixture includes compression plates, spacers, and components to compress the plates. The compression plates are arranged in a vertical orientation so that the compression fixture has top and bottom compression plates. The compression plates and spacers are formed from steel. The plates have the dimensions 150 mm length×150 mm width×12.5 mm height. The spacers have the dimensions 25 mm width×10 mm height. The spacers each have an 8 mm center hole. The components to compress the plates include bolts and nuts. The bolts are 10 mm long.

During the test, the sample (e.g., the cylindrical sample) is placed on the compression fixture between the top and bottom compression plates so that the height of the sample extends along an axis between the top and bottom plates. The nuts and bolts are tightened to move the compression plates together to compress the sample. The spacers are positioned between the compression plates to limit the compression of the sample. In certain examples, the compression plates are moved relatively towards each other (e.g., the top plate is moved towards the bottom plate, the bottom plate is moved towards the top plate, or both plates are moved towards each other) until the compression plates are separated by a height of the spacers. For example, the sample may be compressed to a height of about 10 mm using 10 mm tall steel spacers.

The compressed sample is placed in the oven at a pre-set temperature for a pre-set period of time. In certain examples, the compression fixture and the sample are placed in the oven. The compression fixture holds the sample in the compressed state while in the oven. The compressed sample remains in the oven for 22 hours while the oven maintains an internal temperature of 70° C.

The heated sample and compression fixture are removed from the oven after the pre-set period of time. The top compression plate is removed from the sample to allow the sample to recover. For example, the nuts and bolts may be loosened and/or removed so that the top compression plate can be removed from the sample.

The height of the sample is measured after 100 hours of recovery time. The percent compression set is calculated by the following equation:

$$\text{Compression set} = \frac{(OH - PH)}{(OH - SH)} \times 100 \quad (1)$$

Where OH is the original sample height, PH is the sample height after testing and recovering, and SH is the spacer height.

In one example, a sealing materials suitable for use in the gel sealing applications described herein have a compression set of less than 10% after 100 hours of recovery time, or less than 5% after 100 hours of recovery time, or less than 2% after 100 hours of recovery time.

Resistance to Extrusion

The sealant material can be tested for resistance to extrusion using an extrusion fixture, a pneumatic cylinder, and an oven (e.g., an air-circulating oven). The extrusion fixture includes a body defining an interior test chamber and an extrusion plate that selectively covers a first end of the test chamber. The test chamber is cylindrical in shape and as a diameter of 25 millimeters. The extrusion plate closing one end of the test chamber defines a 4 mm circular opening in its center in fluid communication with the test chamber.

The material to be tested is formed into a cylindrical sample having a diameter of 25 mm and a height of 25 mm.

During the test, the sample is placed inside the cylindrical test chamber and the extrusion plate is placed over the first end of the test chamber. An aluminum cup is placed outside the extrusion fixture beneath the circular opening.

A compression plate is placed behind the sample at an opposite second end of the test chamber. The compression plate is round with a diameter of 25 mm. The compression plate is low friction and formed of plastic. A pneumatic cylinder is operationally coupled to the compression plate to move the compression plate relative to the extrusion fixture. In particular, compression rods of the pneumatic cylinder contact the plastic compression plate.

The pneumatic cylinder is energized and pressurized such that the pneumatic cylinder applies 200 kPa of pressure to the sample. The pressurized sample and pneumatic cylinder are placed in the oven at 70° C. Materials that are not extrusion resistant will fall into the aluminum cups. Materials that are extrusion resistant will bulge out of the opening in a bulbous extrusion. If no part of the sample falls into the aluminum cup, then the pressure is removed from the sample after 24 hours. The sample is allowed to recover with no pressure applied and allowed to return to room temperature. Once the sample returns to room temperature, the volume (if any) that remains extruded in a bulge outside the extrusion plate is measured. In certain examples, suitable materials will have a measured volume of no more than 0.5 cm$^3$, or no more than 0.25 cm$^3$ or 0 cm$^3$.

Elongation to Failure

The sealant material can be tested for tensile elongation using ASTM D638. For example, the material can be tested using a Universal Test Machine (UTM), such as a Universal Testing System offered by Instron of Norwood, Mass. The UTM includes a 2 kg load cell and two cylindrical rods. Each cylindrical rod has a 6 mm diameter and is formed of steel. The rods are each horizontally oriented with a lower rod attached to a stationary base of the UTM and an upper rod attached to the load cell. Accordingly, the lower rod remains stationary relative to the base while the upper rod is movable relative to the lower rod using the load cell.

The material to be tested is cut into rings having an outer diameter of 30 mm and an inner diameter of 20 mm. The rings have a thickness of 3-4 mm.

During the test, the rings are positioned so that the upper and lower rods extend into the rings. The load cell is moved at a rate of 50 mm/min. Accordingly, the upper rod moves away from the lower rod at that rate. As the upper rod is moved, the UTM measures a force applied to the upper rod versus the extension curve of the ring. From these measurements, the elongation to failure is calculated. The elongation to failure is calculated based on the initial length (approximately 31.5 mm) of the ring. In certain examples, suitable materials will have an elongation to failure of at least 300%, or 500% or 800% of the initial length of the sample.

Oil Bleed Out

The sealant material can be tested for oil bleed out to determine the oil loss of the material under pressure. The material to be tested is formed into multiple cylindrical samples each having a diameter of 14 mm and a thickness of 3-4 mm.

The test is performed using a test block, three coarse screens (0.16 mm$^2$ mesh), three fine screens (0.01 mm$^2$ mesh), three pistons, three weights, an analytical balance, and an oven. The test block defines three testing cavities having open upper ends. Each testing cavity is sized to receive one of the cylindrical samples through the open upper end. The weights are shaped to fit partially into respective testing cavities through the open upper ends.

During the test, the initial weight of each sample is measured. Each sample is placed on a respective fine screen. Then, each sample and corresponding fine screen is placed on a respective coarse screen. The screens support the samples while allowing low molecular weight material to separate. Each sample and corresponding screens is placed within one of the cavities defined in the test block.

A respective piston is placed over each sample within the respective testing cavity. A respective weight is placed over each piston to apply 120 kPa of pressure to the respective sample. The weight is shaped so that a portion of the weight extends downwardly into the testing cavity through the open upper end. The test block, screens, samples, pistons, and weights form a testing assembly. The testing assembly is placed in an air circulating oven.

At regular intervals, the testing assembly is removed from the oven and the samples are removed from the testing block. The samples are blotted on cleaning paper and weighed on an analytical balance. After weighing, the samples are replaced within the respective testing cavities and the weights are replaced over the samples. The testing assembly is returned to the oven. These regular intervals are repeated until at least 500 hours have elapsed or the sample weights have stabilized. In certain examples, the sample weight of suitable materials measured at 500 hours will be greater than or equal to 85% of the initial weight (e.g., less than 15% oil bleed out), or greater than or equal to 90% of the initial weight (e.g., less than 10% oil bleed out), or greater than or equal to 95% of the initial weight (e.g., less than 5% oil bleed out).

Example Gel Materials

In certain implementations, sealant material (i.e., gel material) for use in applications of the type disclosed herein includes a hydrosilation cured vinyl-terminated polydimethylsiloxane (PDMS) gel. Additional information on such a gel can be found in U.S. Pat. No. 8,642,891, the disclosure of which is hereby incorporated herein by reference in its entirety. In one example, the gel can be made by reacting a cross-linker, a chain extender and a vinyl-terminated polydimethylsiloxane (PDMS). In other implementations, sealant material for use in applications of the type disclosed herein include peroxide or heat cured vinyl-terminated PDMS gel. In other implementations, sealant material for use in applications of the type disclosed herein includes moisture (and/or UV) cured PDMS gel (various terminations possible, including silanol). In other implementations, sealant material for use in applications of the type disclosed herein includes moisture (and/or UV) cured, silylated polyether (commonly "MS polymer") gel. In certain implementations, the gel material includes polyether or polyester based polyurethane gel. In other implementations, sealant material for use in applications of the type disclosed herein includes chemically crosslinked polyacrylate (acrylic or methacrylic) e.g. n-butyl acrylate or ethyl-hexyl acrylate with triethylene glycol dimethacrylate. In other implementations, sealant material for use in applications of the type disclosed herein includes ionically crosslinked rubber gel. In other implementations, sealant material for use in applications of the type disclosed herein includes chemically crosslinked SBS family TPE gel (crosslinks in polystyrene phase only). In other implementations, sealant material for use in applications of the type disclosed herein includes physically cross-linked triblock polyacrylate gel (e.g. Kurarity®). In other implementations, sealant material for use in applications of the type disclosed herein includes physically crosslinked triblock olefin gel (e.g. Infuse). In other implementations, sealant material for use in applications of the type disclosed herein includes hybrids and/or multiple combinations of above chemistries.

EXAMPLE ASPECTS OF THE DISCLOSURE

Aspect 1. A cable sealing device comprising:
a cable sealing insert having a length, a width and a thickness, the cable sealing insert having first and second opposite ends separated by the length of the cable sealing insert, the first and second ends having end surfaces that extend along the width and the thickness of the cable sealing insert, the cable sealing insert also including first and second opposite sides separated by the width of the cable sealing insert, the first and second sides having side surfaces that extend along the length and the thickness of the cable sealing insert, the sealing insert also including major front and rear sides separated by the thickness of the cable sealing insert, the major front and rear sides respectively including front and rear surfaces that extend along the width and the length of the cable sealing insert, the side surfaces and the end surfaces defining a perimeter shape of the cable insert, and the cable sealing insert defining at least one cable pass-through location for routing a cable through the thickness of the cable sealing insert.

Aspect 2. The cable sealing device of aspect 1, wherein the cable sealing insert defines more than one cable pass-through location.

Aspect 3. The cable sealing device of aspect 1 or 2, wherein the first and second sides of the cable sealing insert converge as the first and second sides extend toward the first end of the cable sealing insert.

Aspect 4. The cable sealing device of any of aspects 1-3, wherein the first end is rounded in an orientation that extends across the width of the cable sealing insert.

Aspect 5. The cable sealing device of any of aspects 1-4, wherein the first end is rounded in an orientation that extends across the thickness of the cable sealing insert.

Aspect 6. The cable sealing device of any of aspects 1-5, wherein the end surface at the second end of the cable sealing insert is not curved in an orientation that extends along the width of the cable sealing insert.

Aspect 7. The cable sealing device of any of aspects 1-6, wherein the cable sealing insert includes sealing protrusions located at the second end of the cable sealing insert that project outwardly from a main body of the cable sealing insert in an orientation that extends along the width of the cable sealing insert.

Aspect 8. The cable sealing device of any of aspects 1-7, further comprising an enclosure defining a pocket for receiving the cable sealing insert, the pocket including notches for receiving the sealing protrusions of the cable sealing insert.

Aspect 9. The cable sealing device of any of aspects 1-8, wherein the enclosure defines first and second housing pieces that meet at a sealing interface that extends about a perimeter of the enclosure, wherein the first housing piece defines the pocket, wherein a sealing gasket extends about the perimeter of the enclosure at the sealing interface and provides sealing between the first and second housing pieces when the first and second housing pieces are engaged together, and wherein the sealing gasket extends across the second end of the cable sealing insert and across the sealing protrusions Aspect 10. The cable sealing device of aspect 9, wherein the first housing piece incudes a groove that extends about the perimeter of the enclosure, wherein the groove includes a base surface and side surfaces, wherein the sealing gasket is positioned within the groove and is supported on the base surface and between the side surfaces, and wherein the notches align with the groove and include protrusion support surfaces that are recessed relative to the base surface.

Aspect 11. The cable sealing device of aspect 10, wherein steps are defined between the base surface and each of the protrusion support surfaces.

Aspect 12. The cable sealing device of any of aspects 9-11, wherein the sealing gasket includes an undulating interface which engages the second end of the cable sealing insert, the undulating interface undulating in an orientation that extends across the thickness of the cable sealing insert, the undulating interface including separate first and second contact locations for contacting the second end of the cable sealing insert, the contact locations being separated from one another in the orientation that extends across the thickness of the cable sealing insert and being separated by a seal recess having an open side that faces the second end of the cable sealing insert.

Aspect 13. The cable sealing device of any of aspects 1-12, wherein the cable sealing insert includes lips that can be removed from a remaining portion the cable sealing insert to reduce an overall volume of the cable sealing insert.

Aspect 14. The cable sealing device of aspect 13, wherein the lips can be torn away from the remaining portion of the cable sealing insert.

Aspect 15. The cable sealing device of aspect 13, wherein the lips are configured to be pushed out of the cable sealing insert as a cable is inserted through the cable pass-through location.

Aspect 16. The cable sealing device of any of aspects 13-15, wherein the lips are separated by slits.

Aspect 17. The cable sealing device of any of aspects 13-16, wherein the lips curve about a cable insertion axis defined at the cable pass-through location.

Aspect 18. The cable sealing device of any of aspects 13-17, wherein the lips are located at an interior of the cable sealing insert.

Aspect 19. The cable sealing device of any of aspects 13-17, wherein the lips are located at an exterior of the cable sealing insert and extend along the perimeter shape of the cable sealing insert.

Aspect 20. The cable sealing device of any of aspects 13-19, wherein the lips include at least two lips.

Aspect 21. The cable sealing device of aspect 20, wherein the lips includes at least three lips.

Aspect 22. The cable sealing device of any of aspects 13-21, wherein the lips include parallel strips of sealant material.

Aspect 23. The cable sealing device of any of aspects 13-22, wherein the slits extend at least partially through the thickness of the cable sealing insert.

Aspect 24. The cable sealing device of aspect 23, wherein the slits extend through a majority of a length of the thickness of the cable sealing insert.

Aspect 25. The cable sealing device of any of aspects 13-24, wherein the lips are unitarily connected with remaining portion of the cable sealing insert prior to being removed from the cable sealing insert.

Aspect 26. The cable sealing device of any of aspects 13-25, wherein the lips are located at the second end of the cable sealing insert.

Aspect 27. The cable sealing device of aspect 25, wherein the lips have lengths that extend along the width of the cable sealing insert, thicknesses that extend along the length of the cable sealing insert and widths that extend along the thickness of the cable sealing insert.

Aspect 28. The cable sealing device of any of aspects 13-25, wherein the remaining portion of the cable sealing insert is a main body of the cable sealing insert, and wherein the lips are unitary with a lip connecting portion of the cable sealing insert that is unitarily connected with the main body of the cable sealing insert.

Aspect 29. The cable sealing device of aspect 28, wherein the lip connecting portion is located at the major front side or the major rear side of the cable sealing insert.

Aspect 30. The cable sealing device of aspect 28, wherein the lip connecting portion is located at an intermediate location between the major front and read sides of the cable sealing insert.

Aspect 31. The cable sealing device of aspect 30, wherein the intermediate location is at a mid-location between the major front and rear sides of the cable sealing insert.

Aspect 32. The cable sealing device of any of aspects 28-31, wherein the lips are provided at front and rear sides of the lip connection portion.

Aspect 33. The cable sealing device of aspect 32, wherein the lips include front lips that extend forwardly from the lip connecting portion toward the major front side of the cable sealing insert, and rear lips that extend rearwardly from the lip connecting portion toward the major rear side of the cable sealing insert.

Aspect 34. The cable sealing device of aspects 28 or 29, wherein the lips extend across at least a portion of the thickness of the cable sealing insert and are all located at only one of a front or rear side of the lip connecting portion.

Aspect 35. The cable sealing device of any of aspects 1-12, further comprising front and rear sealant containment walls respectively positioned at the major front and rear sides of the cable sealing insert, wherein the cable pass-through location includes a cable port that extends through the thickness of the cable sealing insert, wherein the cable port defines major cross-dimensions adjacent the major front and rear sides of the cable sealing insert, and wherein the cable port defines a minor cross-dimension at an intermediate location between the major front and rear sides.

Aspect 36. The cable sealing device of aspect 35, wherein the front and rear containment walls define cable openings that align with the cable port, and wherein the cable openings have cross-dimensions that are equal to or larger than the major cross-dimensions of the cable port.

Aspect 37. The cable sealing device of aspects 35 or 36, wherein the front and rear sealant containment walls are respectively secured to the major front and rear sides of the cable sealing insert.

Aspect 38. The cable sealing device of any of aspects 1-34, further comprising a plurality of volume compensating holes that extend at least partially through the thickness of the cable sealing insert.

Aspect 39. The cable sealing device of aspect 38, wherein the volume compensating holes are not configured for receiving cables.

Aspect 40. The cable sealing device of any of aspects 38 or 39, wherein the volume compensating holes extend only partially through the thickness of the cable sealing insert.

Aspect 41. The cable sealing device of any of aspects 38 or 39, wherein the volume compensating holes extend fully through the thickness of the cable sealing insert.

Aspect 42. The cable sealing device of any of aspects 38-41, further comprising a filler material contained within the volume compensating openings.

Aspect 43. The cable sealing device of aspect 42, wherein the filler material is a resilient material.

Aspect 44. The cable sealing device of aspect 43, wherein the resilient material includes foam.

Aspect 45. The cable sealing device of any of aspects 1-34, further comprising a resilient material embedded in the cable sealing insert.

Aspect 46. The cable sealing device of aspect 45, wherein the resilient material includes a plurality of discrete volumes dispersed within the cable sealing insert.

Aspect 47. The cable sealing device of aspect 45, wherein the resilient material includes a plurality of portions positioned at separate locations within the cable sealing insert.

Aspect 48. The cable sealing device of any of aspects 45-47, wherein the resilient material includes foam.

Aspect 49. The cable sealing device of any of aspects 1-34, further comprising a plurality of discrete closed gas cells enclosed within an interior in the cable sealing insert.

Aspect 50. The cable sealing device of any of aspects 1-49, further comprising an enclosure defining a pocket for receiving the cable sealing insert.

Aspect 51. The cable sealing device of aspect 50, further comprising a wedge for pressurizing the cable sealing insert.

Aspect 52. The cable sealing device of aspect 50 or 51, further comprising a spring for maintaining pressure on the cable sealing insert within the pocket.

Aspect 53. The cable sealing device of aspect 52, where the spring is a leaf spring.

Aspect 54. The cable sealing device of aspect 53, wherein the spring is integrated in a wedge clip having first and second parallel legs coupled together at one end by a bridge portion that traverses a gap between the legs.

Aspect 55. The cable sealing device of aspect 54, wherein the wedge clip opposes the major front side or the major rear side of the cable sealing insert.

Aspect 56. The cable sealing device of any of aspects 50-54, further comprising structure within the pocket defining void space into which sealant material of the cable sealing insert can extrude when the cable sealing unit is pressurized, wherein the void space provides volume compensation and the extruded sealant material provides stored energy for maintaining pressurization of the cable sealing unit.

Aspect 57. The cable sealing device of aspect 56, wherein the void space is defined between projections that embed in the cable sealing insert when the cable sealing insert is pressurized.

Aspect 58. The cable sealing device of aspect 57, wherein the projections include a bed of pins or a plurality of ribs.

Aspect 59. The cable sealing device of aspect 57 or 58 wherein the projections are integrated with a volume compensation clip having first and second parallel legs coupled together at one end by a bridge portion that traverses a gap between the legs.

Aspect 60. The cable sealing device of any of aspects 57-59, wherein the projections embed into the major front side or the major rear side of the cable sealing insert.

Aspect 61. The cable sealing device of any of aspects 1-60, wherein the cable sealing insert includes recesses at the first and second opposite sides.

Aspect 62. The cable sealing device of aspect 61, wherein the first and second sides have concave curvatures that curve in an orientation along the length of the cable sealing insert and which define the recesses at the first and second opposite sides.

Aspect 63. The cable sealing device of any of aspects 1-62, further comprising a removable liner that adheres to the first and second opposite sides of the cable sealing insert for facilitating inserting the cable sealing insert into a pocket of an enclosure.

Aspect 64. The cable sealing device of aspect 63, wherein the liner is re moved from the cable sealing insert after the cable sealing insert has been inserted into the pocket.

Aspect 65. The cable sealing device of aspect 63 or 64, wherein the liner is a film or a foil.

Aspect 66. The cable sealing device of any of aspects 63-65, wherein the liner is removed from the cable sealing insert in separate pieces.

Aspect 67. The cable sealing device of aspect 66, wherein the separate pieces include a first piece corresponding to the first side of the cable sealing insert and a second piece corresponding to the second side of the cable sealing insert.

Aspect 68. The cable sealing device of any of aspects 1-67, further comprising front and rear sealant containment walls respectively positioned at the major front and rear sides of the cable sealing insert, and wherein the first end is rounded in an orientation that extends across the thickness of the cable sealing insert.

Aspect 69. The cable sealing device of aspect 68, wherein the first end is rounded in an orientation that extends across the width of the cable sealing insert.

Aspect 70. The cable sealing device of any of aspects 68-69, wherein the front and rear containment walls have ends that are internally chamfered adjacent the first end of the cable sealing insert.

Aspect 71. The cable sealing device of any of aspects 68-70, wherein the front and rear sealant containment walls are respectively secured to the major front and rear sides of the cable sealing insert.

Aspect 72. The cable sealing device of any of aspects 68-71, wherein the front and rear sealant containment walls are respectively defined by front and rear sealant containment plates carried with the cable sealing insert.

Aspect 73. The cable sealing device of any of aspects 1-72, further comprising front and rear sealant containment walls respectively secured at the major front and rear sides of the cable sealing insert, wherein the cable sealing insert and the front and rear containment walls are constructed and arranged to provide a wrap-around configuration for allowing a cable to be inserted laterally into the cable pass-through location.

Aspect 74. The cable sealing device of aspect 73, wherein the front and rear containment walls and the cable sealing insert define an access slit that extends through the thickness of the cable sealing insert from the cable pass-through location to the perimeter shape of the cable sealing insert, wherein the front and rear sealant containment walls and the cable sealing insert also define at least one hinge slit that extends from the cable pass-through location to a hinge location positioned inside the perimeter shape, and wherein the access slit and the hinge slit allow a flap portion of the cable sealing insert to be moved relative to a main body portion of the cable sealing insert between a closed position and an open position, wherein a cable can be laterally inserted into the cable pass-through location when the flap is in the open position, and wherein with the cable positioned at the cable pass-through location, the flap portion can be wrapped around the cable to enclose the cable in the cable pass-through location by moving the flap portion from the open position to the closed position.

Aspect 75. The cable sealing device of aspect 74, wherein the hinge slit extends along a majority of the length of the cable sealing insert.

Aspect 76. The cable sealing device of aspect 74 or 75, further including an enclosure defining a pocket for receiving the cable sealing insert with the front and rear containment walls carried therewith, the enclosure including front and rear pocket walls, and wherein a majority of a length of the hinge slit is covered by the front and rear pocket walls when the cable sealing insert is mounted in the pocket.

Aspect 77. The cable sealing device of aspect 74, wherein the front and rear sealant containment walls include sealant containment fingers that can flex radially outwardly from a neutral position to accommodate larger cables, and wherein hinge slits are positioned between the sealant containment fingers for allowing the flap portion to be moved between the closed and open positions.

Aspect 78. The cable sealing device of aspect 77, wherein the sealant containment fingers have hooked ends that embed in the cable sealing insert.

Aspect 79. The cable sealing device of any of aspects 1-72, further comprising front and rear sealant containment walls respectively secured at the major front and rear sides of the cable sealing insert, wherein the front and rear sealant containment walls include sealant containment fingers that can flex radially outwardly from a neutral position to accommodate larger cables, and wherein the sealant containment fingers have hooked ends that embed in the cable sealing insert.

Aspect 80. The cable sealing device of any of aspects 1-79, wherein the cable sealing device has a composition having a residual hardness in the range of 20-80 g after one hour, and/or a compression set less than 10% after 100 hours, and/or a resistance to extrusion having a measured volume less than 0.5 cubic centimeters, and/or an elongation to failure of at least 300%, and/or an oil bleed out less than 15% by weight measured at 500 hours.

From the foregoing detailed description, it will be evident that modifications and variations can be made to the enclosures and cable sealing devices disclosed herein without departing from the spirit or scope of the disclosure.

What is claimed is:

1. A cable sealing device comprising:
a cable seal defining a cable pass-through location for passing a cable through a thickness of the cable seal, the cable seal including lips removable from a remaining portion the cable seal to reduce an overall volume of the cable seal;
wherein the lips include at least three lips separated by slits;
wherein the slits extend through a majority of a length of the thickness of the cable seal;
wherein the lips are unitarily connected with a lip connecting portion of the cable seal prior to being removed from the cable seal such that the slits extend through a majority of the thickness of the seal but not through the lip connecting portion; and
wherein the lips are configured to be torn away from the remaining portion of the cable seal.

2. The cable sealing device of claim 1, wherein the lips are configured to be pushed out of the cable seal as a cable is inserted through the cable pass-through location.

3. The cable sealing device of claim 1, wherein the lips curve about a cable insertion axis defined at the cable pass-through location.

4. The cable sealing device of claim 1, wherein the lips are located at an interior of the cable seal.

5. The cable sealing device of claim 1, wherein the lips are located at an exterior of the cable seal at a perimeter of the cable seal.

6. The cable sealing device of claim 1, wherein the lips include parallel strips of sealant material.

7. The cable sealing device of claim 1, wherein the cable seal includes first and second opposite ends separated by a length, and wherein the lips are located at one of the first and second ends of the cable seal.

8. The cable sealing device of claim 7, wherein the lips have lengths that extend along a width of the cable seal, thicknesses that extend along the length of the cable seal and widths that extend along the thickness of the cable seal.

9. The cable sealing device of claim 1, wherein the remaining portion of the cable seal is a main body of the cable seal, and wherein the lips are unitary with the lip connecting portion of the cable seal that is unitarily connected with the main body of the cable seal.

10. The cable sealing device of claim 9, wherein the thickness of the cable seal extends between front and rear sides of the cable seal, and wherein the lip connecting portion is located at the front side or the rear side of the cable seal.

11. The cable sealing device of claim 9, wherein the thickness of the cable seal extends between front and rear sides of the cable seal, and wherein the lip connecting portion is located at an intermediate location between the front and rear sides of the cable seal.

12. The cable sealing device of claim 11, wherein the intermediate location is at a mid-location between the front and rear sides of the cable seal.

13. The cable sealing device of claim 11, wherein the lips are provided at front and rear sides of the lip connecting portion.

14. The cable sealing device of claim 1, wherein the cable seal includes a one-piece molded cable sealing insert defining a perimeter profile, the cable sealing insert including a main body, the perimeter profile of the cable sealing insert having an elongate length that extends along a first axis between first and second ends of the main body, the first end of the main body being rounded and the second end of the main body being flat, the perimeter profile of the cable sealing insert also including first and second opposite sides of the main body that extend between the first and second ends of the main body, the first and seconds sides being oriented to diverge away from one another as the first and second sides extend toward the second end of the main body such that the main body has a tapered configuration, the main body of the cable sealing insert further having major front and back sides separated by the thickness of the cable seal, the main body fully defining at least one cable pass-through opening that extends through the thickness of the cable seal between the major front and back sides of the main body, and the lips being provided at the second end of the main body.

15. The cable sealing device of claim 14, wherein the cable sealing insert is made of a material having a Shore 000 hardness in the range of 30-60 and a compression set less than or equal to 10 percent.

* * * * *